United States Patent
Yonezawa

(10) Patent No.: US 7,215,606 B2
(45) Date of Patent: May 8, 2007

(54) OPTICAL DISK DEVICE AND DISTURBANCE LEARNING METHOD FOR OPTICAL DISK DEVICE

(75) Inventor: Minoru Yonezawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 555 days.

(21) Appl. No.: 10/629,917

(22) Filed: Jul. 30, 2003

(65) Prior Publication Data

US 2004/0076091 A1 Apr. 22, 2004

(30) Foreign Application Priority Data

Jul. 30, 2002 (JP) ............................ 2002-221834

(51) Int. Cl.
*G11B 7/00* (2006.01)

(52) U.S. Cl. .................. 369/44.29; 369/44.32

(58) Field of Classification Search ............. 369/44.29, 369/44.32

See application file for complete search history.

(56) References Cited

U.S. PATENT DOCUMENTS

| 5,084,848 | A | * | 1/1992 | Deguchi et al. | ......... | 369/44.25 |
| 5,475,662 | A | * | 12/1995 | Miyagawa et al. | ...... | 369/44.26 |
| 6,768,705 | B2 | * | 7/2004 | Hirai | ...................... | 369/44.28 |
| 2002/0196717 | A1 | * | 12/2002 | Masui et al. | ............. | 369/44.29 |
| 2004/0218494 | A1 | * | 11/2004 | Lee et al. | ................ | 369/53.18 |

FOREIGN PATENT DOCUMENTS

| CN | 1233041 A | 10/1999 |
| JP | 60-55520 | 3/1985 |
| JP | 61-233435 | 10/1986 |
| JP | 08-077589 | * 3/1996 |
| JP | 8-77589 | 3/1996 |
| JP | 9-50303 | 2/1997 |
| JP | 10-177729 | 6/1998 |
| JP | 11-086309 | * 3/1999 |
| JP | 11-86309 | 3/1999 |
| JP | 2001-307341 | 11/2001 |

OTHER PUBLICATIONS

Chinese Office Action dated Apr. 29, 2005 for Appln. No. 03152422.2.
Japanese Office Action dated Nov. 9, 2004, for Japanese Patent Application No. 2002-221834.
Jpn. Pat. Appln. KOKAI Pub. No. 8-77589 "Optical Disk Apparatus"; Mitsubishi Electric Corporation; published on Mar. 22, 1996, *Concise Explanation, This document discloses a method of varying the gain of a control system, on the basis of correlation between an error signal of a previous period and an error signal of a current period, See p. 1 of this application.

(Continued)

*Primary Examiner*—Thang V. Tran
*Assistant Examiner*—Van T. Pham
(74) *Attorney, Agent, or Firm*—Pillsbury Winthrop Shaw Pittman, LLP

(57) ABSTRACT

An optical disk device comprises position control portions which carry out position control of at least one of an optical head and an objective lens based on a detection signal from the optical head, and disturbance learning portions which reduce a compensation gain of the position control portion in a range in which servo control is not deviated, and detect disturbance information of the optical disk to store it as learning disturbance information. Fine disturbance information can be reliably learned because the information is not affected by the compensation gain.

15 Claims, 23 Drawing Sheets

OTHER PUBLICATIONS

Jpn. Pat. Appln. KOKAI Pub. No. 9-50303 "Repeat Compensator and Disk Apparatus having the Same"; Mitsubishi Electric Corporation; published on Feb. 18, 1997, *Concise Explanation, This document discloses a method of varying the gain of a control system, on the basis of correlation between an error signal of a previous period and an error signal of a current period.

Jpn. Pat. Appln. KOKAI Pub. No. 11-86309 "Optical Disk Control Apparatus"; Sony Corporation; published on Mar. 30, 1999, *Concise Explanation, This document discloses a learning compensator, which has a signal generating circuit adapted to change of the rotation number and generates a learning timing, See p. 2 of this application.

* cited by examiner

OPTICAL DISK DEVICE AND DISTURBANCE LEARNING METHOD FOR OPTICAL DISK DEVICE

CROSS-REFERENCE TO RELATED APPLICATIONS

This application is based upon and claims the benefit of priority from the prior Japanese Patent Application No. 2002-221834, filed Jul. 30, 2002, the entire contents of which are incorporated herein by reference.

BACKGROUND OF THE INVENTION

1. Field of the Invention

The present invention relates to an optical disk device for learning disturbance of an optical disk. More particularly, the present invention relates to an optical disk device and a disturbance learning method for the optical disk device for carrying out reliable disturbance learning by reducing a servo gain during learning.

2. Description of the Related Art

Recently, an optical disk device such as DVD (Digital versatile Disc) has been developed and widely known. In such an optical disk device or the like, it is required to improve operational reliability more remarkably.

As one example of such an optical disk device, in Jpn. Pat. Appln. KOKAI Publication Nos. 8-77589 and 9-50303, there is disclosed an optical disk device having a stable control system for taking a correlation between an error signal before one cycle and a current error signal, and increasing a gain of the control system when this correlation is strong, or reducing the gain of the control system when the correlation is weak so as not to respond to a component other than damage or dust and cyclic disturbance such as external vibration.

Similarly, in Jpn. Pat. Appln. KOKAI Publication No. 11-86309, there is disclosed a learning compensator comprising a signal generator circuit which changes along with the rotation number, the learning compensator generating a timing for learning, thereby enabling learning in which a time delay becomes constant even if the rotation number changes, in an optical disk device having a changed rotation number.

In the prior art disclosed in these references, respectively, a repetition learning device is used to lean a disturbance component generated along with the disk rotation to compensate for the component in a feed forward manner.

However, in these disturbance learning processes, there is a problem that a disturbance value is small as compared with a control gain, thus disabling sufficient learning.

In addition, in the case of an optical disk device having a changed rotation number, since a disturbance suppression rate changes depending on a frequency and a positioning error quantity changes depending on the frequency, there is a problem that a precise disturbance value cannot be obtained.

Further, in a recording type optical disk device, since a disk reflection index differs depending on whether or not information is recorded in a target optical disk, that is depending on a recorded region or an unrecorded region, it is inevitable that the gain of the control system changes frequently. Therefore, a precise disturbance value cannot be obtained in the recording type optical disk.

In other words, in the conventional optical disk device, since a value of disturbance information in an optical disk is comparatively small, the disturbance value is affected by the gain of servo control or a change in the rotation number of the optical disk. In addition, in the case of the recording type optical disk, the disturbance value is affected by a difference between reflection indexes of the recorded region and the unrecorded region. Thus, there is a problem that a process of learning of precise disturbance information cannot be carried out.

BRIEF SUMMARY OF THE INVENTION

According to one aspect of the present invention, there is provided an optical disk device comprising an optical head which emits a laser beam to an optical disk and receives a reflection light by using an objective lens, thereby carrying out one of a recording process and a reproduction process, a position control portion which carries out position control of at least one of the optical head and the objective lens by a compensation gain based on a detection signal from the optical head, and a disturbance learning portion which adjusts the compensation gain of the position control portion, detects disturbance information of the optical disk by using the optical head to store it as learning disturbance information.

DETAILED DESCRIPTION OF THE INVENTION

Hereinafter, preferred embodiments of an optical disk device according to the present invention will be described in detail with reference to the accompanying drawings.

<Optical Disk Device According to the Present Invention>

Figure 1:
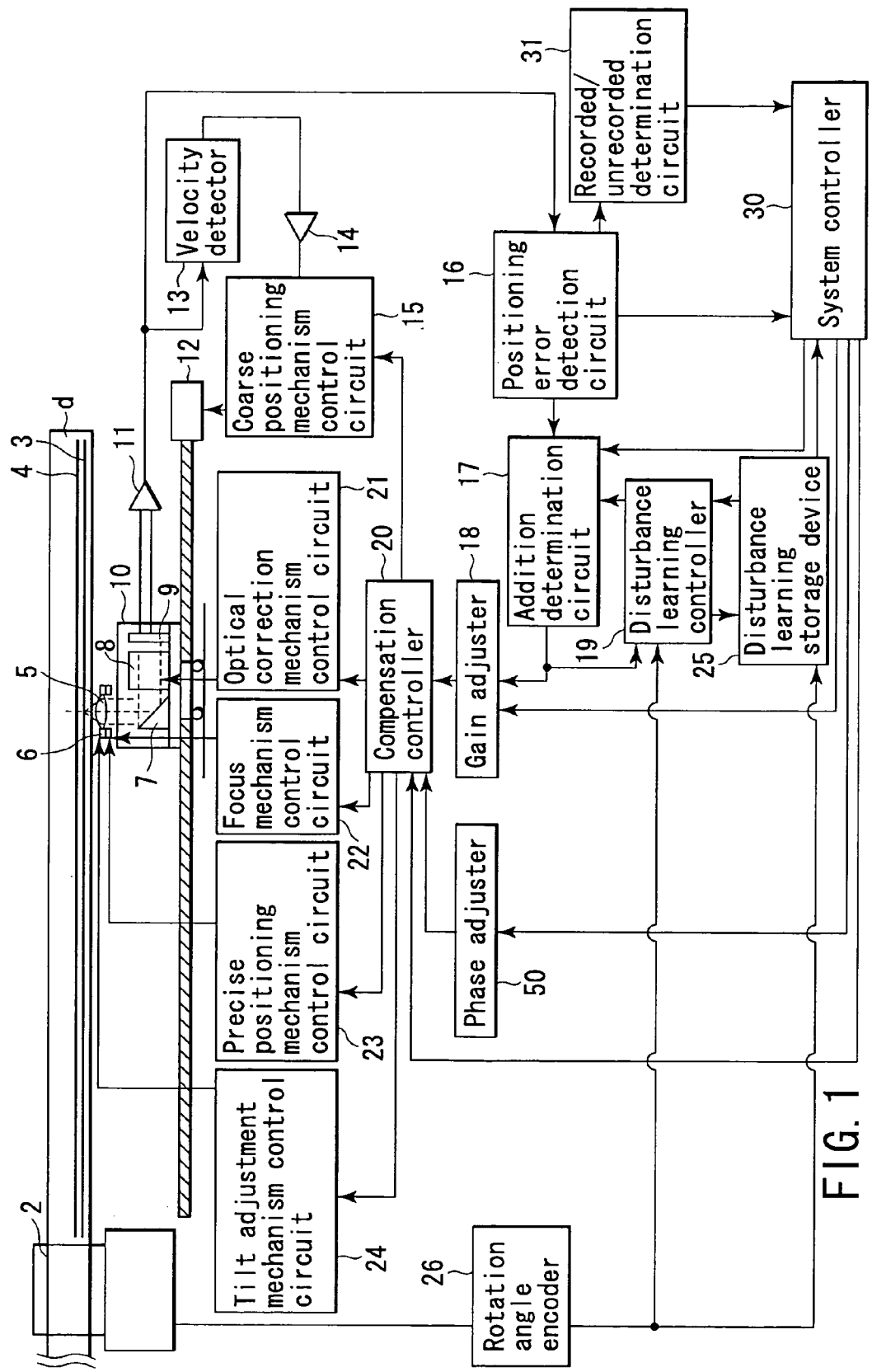
FIG. 1 is a block diagram showing an example of a configuration of an optical disk device according to a first embodiment of the present invention.
Figure 2:
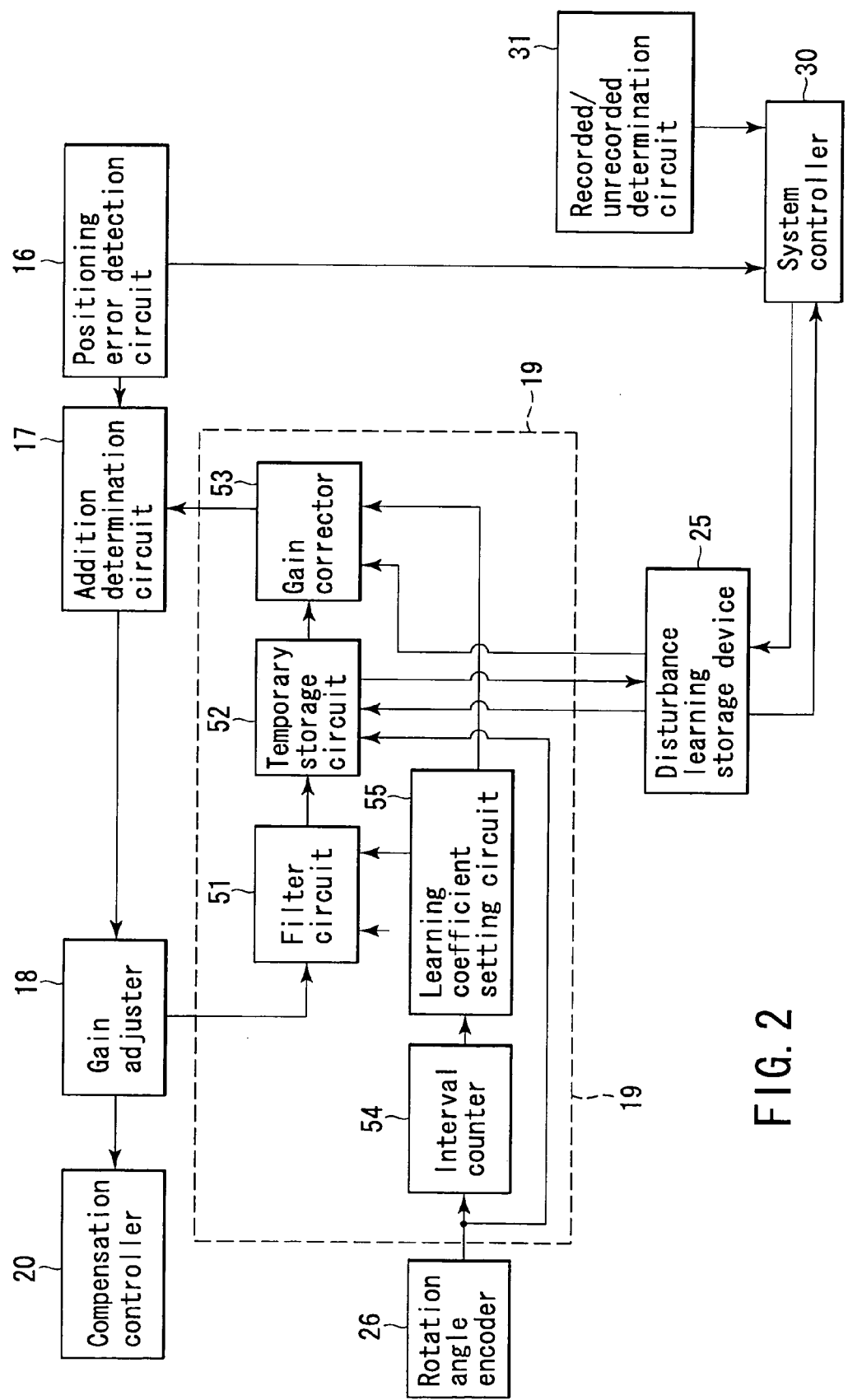
FIG. 2 is a block diagram showing another example of the configuration of the optical disk device according to the first embodiment of the present invention.
Figure 3:
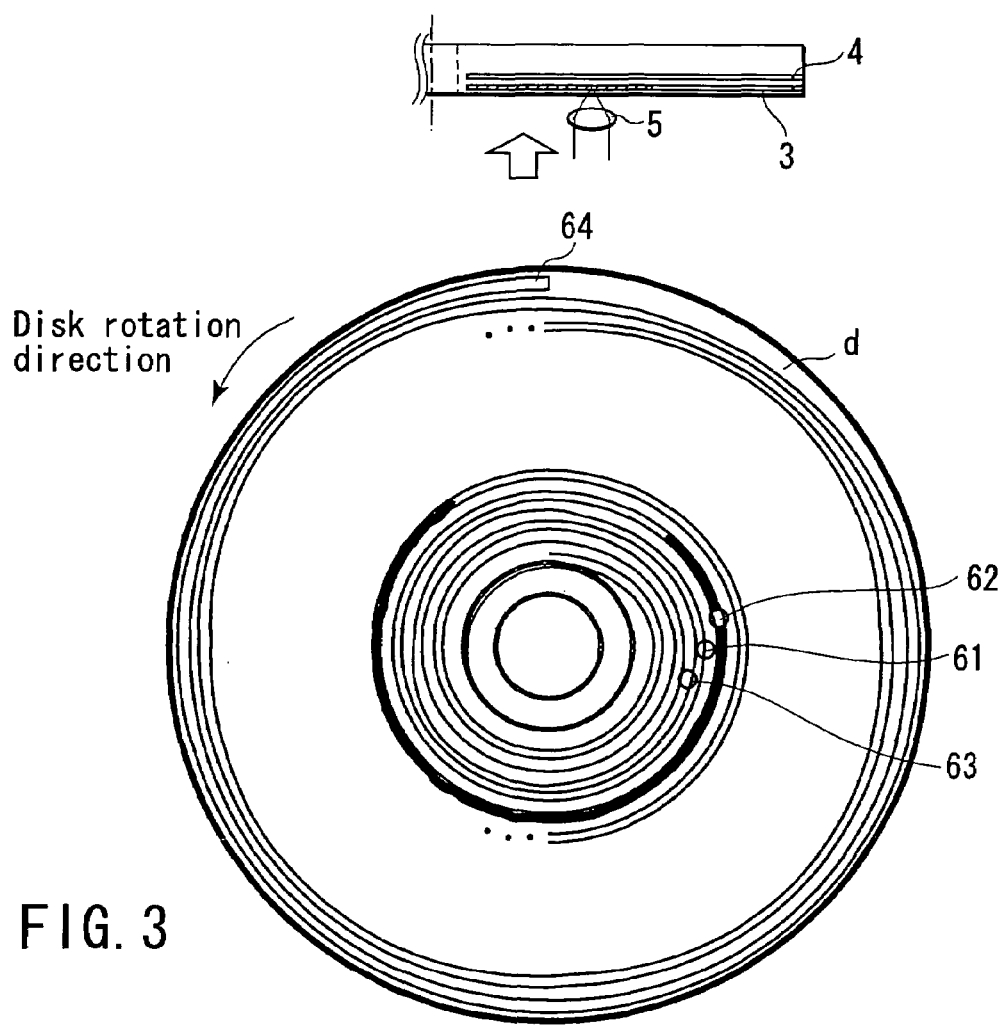
FIG. 3 is a diagram showing a relationship between an objective lens and an optical disk of an optical head in the optical disk device according to the first embodiment of the present invention.
Figure 4:
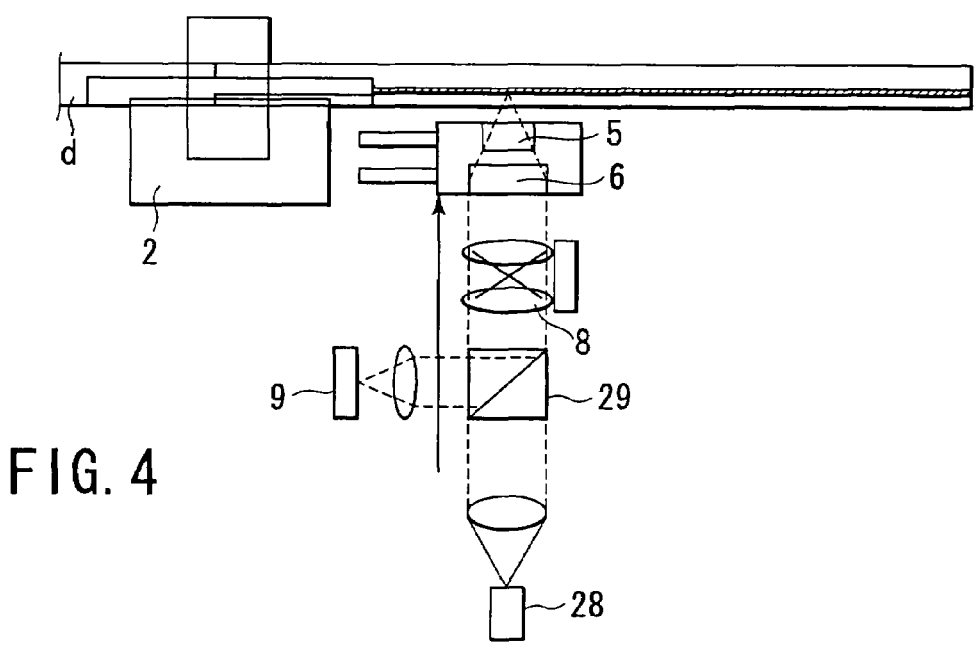
FIG. 4 is a configuration diagram showing an optical system of the optical head in the optical disk device according to the first embodiment of the present invention.
Figure 5:
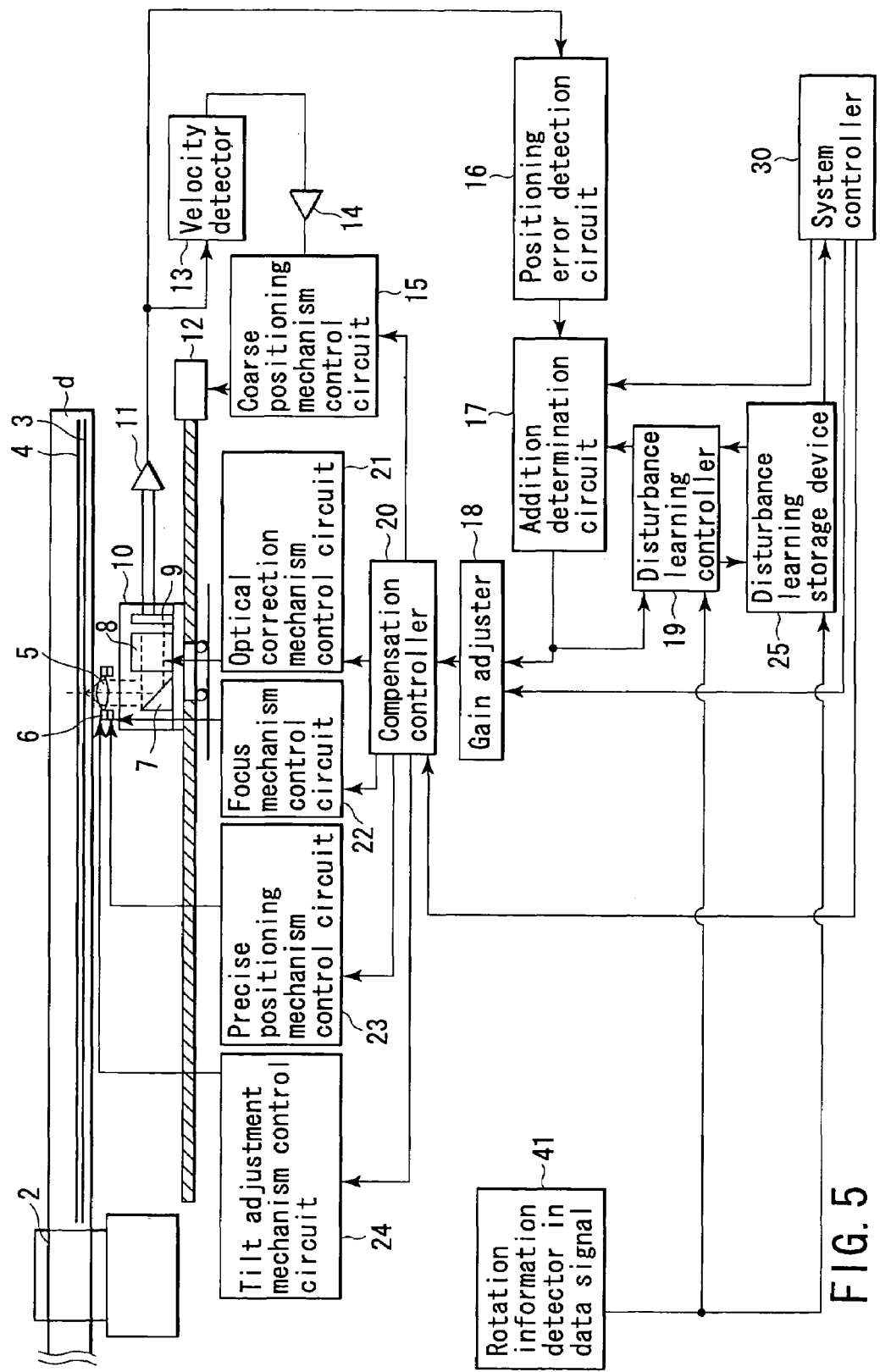
FIG. 5 is a block diagram showing another example of the configuration of the optical disk device according to the first embodiment of the present invention.

A description will be given with respect to a configuration of an optical disk device according to a first embodiment of the present invention. FIG. 1 is a block diagram showing an example of a configuration of the optical disk device according to the first embodiment of the present invention. FIG. 2 is a block diagram showing another example of the configuration of the optical disk device according to the first embodiment of the present invention. FIG. 3 is a diagram showing a relationship between an objective lens and an optical disk of an optical head. FIG. 4 is a configuration diagram of an optical system of the optical head. FIG. 5 is a block diagram showing another example of the configuration of the optical disk device according to the first embodiment of the present invention.

An optical disk "d" to be processed by the optical disk device according to the first embodiment of the present invention is a rewritable type optical disk or reproduction only optical disk comprising a phase change recording layer as a recording layer as shown in FIG. 2. This optical disk is a recording medium which has a first recording layer 3 and a second recording layer 4 in which information recording/reproduction is carried out by a light beam focused by an objective lens 5 which the optical disk device according to the present invention has. The optical disk "d" is rotationally controlled by a spindle motor 2 which the optical disk device has. In particular, when information recording is carried out, a ZCLV (Zoned Constant Linear Velocity) scheme or the like is employed to maintain a rotational linear velocity to be constant.

Further, in the optical disk device according to the present invention shown in FIG. 1, an optical head 10 emits a laser beam having a predetermined wavelength to a predetermined recording layer of the optical disk, thereby carrying out recording (mark forming). This recording is carried out by a mark length recording scheme having information on an edge of a recording mark. The laser light emitted from a laser light source provided on the optical head 10 is collimated to be parallel lights to be made incident to an optical correction mechanism 8 via an optical element (not shown). This optical correction mechanism 8 carries out aberration correction by a relay lens or a liquid crystal element so that an optical spot formed in a recording layer, for example, does not have a spherical aberration. The light beams corrected by this optical aberration correction mechanism 8 are further made incident to the objective lens 5 via a rising mirror 7 to form an optical spot on a predetermined information recording face of the optical disk "d". On the other hand, the light beams reflected on the information recording face is partially made incident again to a photo-detector 9 via the rising mirror 7. This photo-detector 9 detects a position error relevant to a target position of the optical spot focused on the information recording face by photoelectric conversion of detection cells divided in plurality. This position errors include a focus position error for forming an optical spot focused relevant to the information recording face, a track position error, a tilt error, and a spherical aberration error.

An information track for carrying out information recording/reproduction is formed on the information recording face. A position deviation in an optical disk radial direction relevant to this target track is a track position error. A tilt error is a deviation angle between an optical axis of a light beam emitted by the objective lens 5 and a normal line of the optical disk "d". If this angle is large, coma aberration occurs in an optical spot so that a spot quality is degraded. Lastly, a spherical aberration is an aberration which degrades the spot quality of the optical spot similarly, and occurs due to a deviation of a wave face focused by the objective lens 5 from a spherical face.

In the optical disk device, the above various position errors are detected by a positioning error detection circuit 16 using a photo-detector 10, a differential circuit 11, and the like. Then, control operation quantities corresponding to the respective positioning errors are calculated by a compensation controller 20 so that a proper optical spot is formed. Further, the control operation quantities are input to an optical correction mechanism control circuit 21, a focus mechanism control circuit 22, a precise positioning mechanism control circuit 23, a coarse positioning mechanism control circuit 17, and a tilt adjustment mechanism control circuit 24, respectively.

Each of these control circuits controls driving of the optical correction mechanism 8, an objective lens positioning mechanism 6, and a coarse positioning mechanism 12 so that an optical spot is properly formed at a target position. Further, an output from the differential circuit 11 is provided to a velocity detector 13 and the positioning error detection circuit 16, and the output thereof is provided to a recorded/unrecorded determination circuit 31. An output of the velocity detector 13 is provided to an amplifier 14 to be input to a coarse positioning mechanism control circuit 15. The coarse positioning mechanism control circuit 15 controls driving of the coarse positioning mechanism 12.

Further, an output of the positioning error detection circuit 16 is supplied to the addition determination circuit 17 and a system controller 30 which controls the entire operations. A determination output of the addition determination circuit 17 is supplied to a disturbance learning controller 19 and a gain adjuster 18. Further, the disturbance learning controller 19 is connected to a disturbance learning storage device 25, and is controlled by the system controller 30. An output of the gain adjuster 18 is supplied to the compensation controller 20, where focus control, tracking control, tilt control, or the like is carried out according to the adjusted control gain. Further, an output of a rotation angle encoder 26 coaxial to the spindle motor 2 is supplied to the disturbance learning controller 19 and the disturbance learning storage device 25, respectively.

In addition, a phase adjuster 50 for adjusting a phase according the gain adjusted by the gain adjuster 18 is controlled by the system controller 30 to adjust the phase of the gain of the gain adjuster 18.

In addition to such a configuration of the drive system of the optical head 10, the optical disk device has configurations of a recording process system, a reproduction process system, and a control system (not shown). In other words, this optical disk device has a data reproduction circuit which is a circuit of the reproduction process system connected to the optical head 10, a laser control circuit which is a circuit of the recording process system and which controls light emission of a semiconductor laser diode incorporated in the optical head 10, an interface circuit which makes data communication with a CPU which is a constituent element of a control portion which governs these operations, a RAM or ROM which is a storage region, and an external device, and the like.

In addition, FIG. 2 shows an example of a configuration of the disturbance learning controller 19. This controller has an interval counter 54 which receives an output of the rotation angle encoder 26, a learning coefficient setting circuit 55 to which the output of the counter is supplied, and a gain corrector 53 to which the output of the setting circuit is supplied. Further, the disturbance learning controller 19 further has a filter circuit 51 which receives an output from the gain adjuster 18 and an output of the learning coefficient setting circuit 55, a temporary storage circuit 52 which receives the output of the filter circuit 51, and a gain corrector 53 which receives the output of the storage circuit 52. Further, the temporary storage circuit 52 is connected to the disturbance learning storage device 25, and exchanges learning disturbance information therewith.

Further, FIG. 3 shows a relationship between an objective lens and an optical disk of an optical head in the optical disk device according to the first embodiment of the present invention. FIG. 4 shows a detailed optical system configuration of the optical head 10 in the optical disk device according to the present invention. In FIG. 3, the optical disk "d" has two information recording layers 3 and 4 on one face. The information track of each information recording layer has a single spiral groove structure 64 capable of continuously recording from the inner periphery to the outer periphery. A main spot 61 formed by a laser light from the objective lens 5 and sub-spots 62 and 63 are shown here. In addition, in FIG. 4, a laser light emitted from a laser light source 28 is optically adjusted by the optical correction mechanism using the relay lens 8. Further, a half prism 29 is used in order to travel a return light from the optical disk "d" to an error signal detection system.

<First Embodiment>

Figure 6:
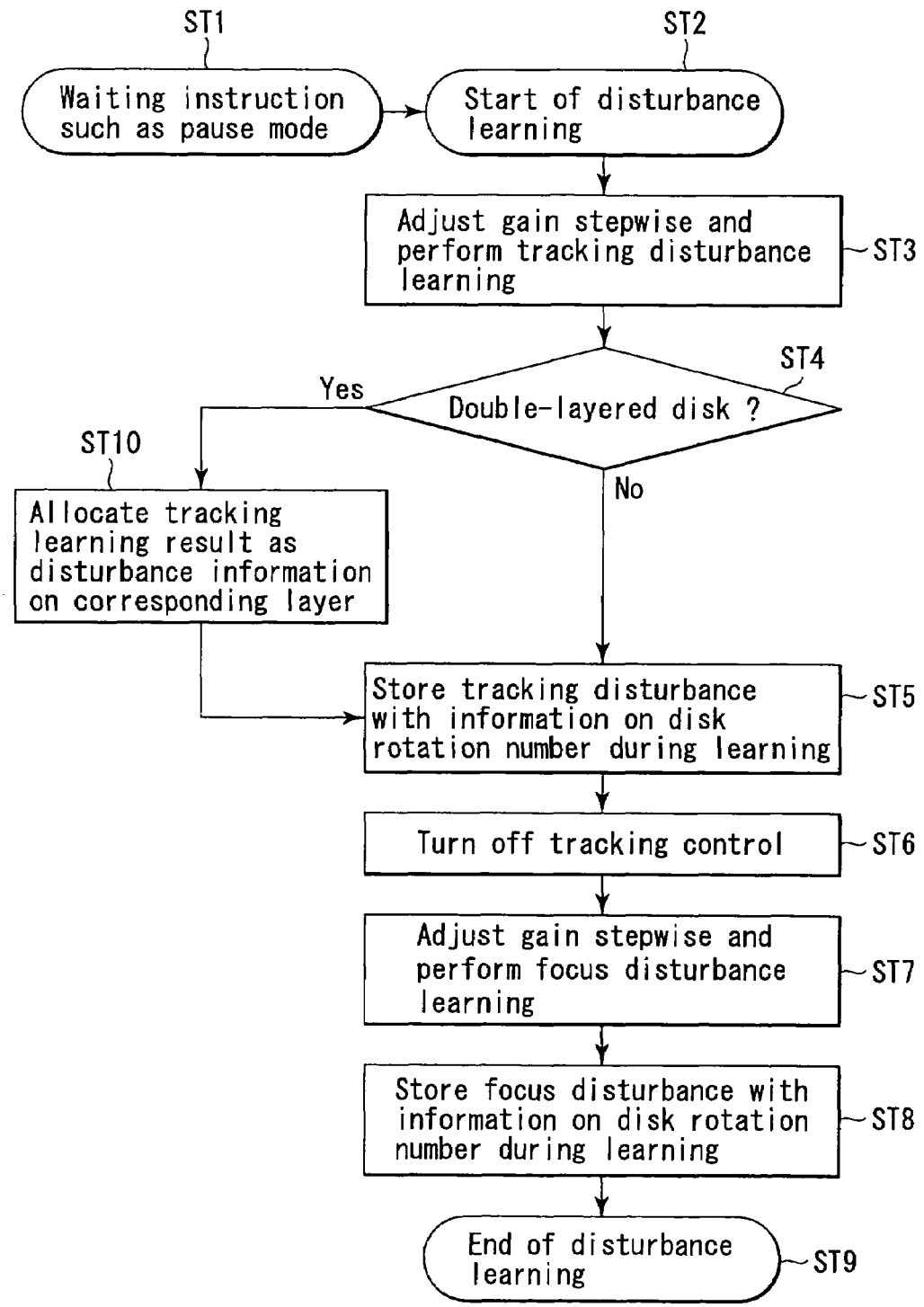
FIG. 6 is a flow chart for explaining a disturbance learning process of the optical disk device according to the first embodiment of the present invention.
Figure 7:
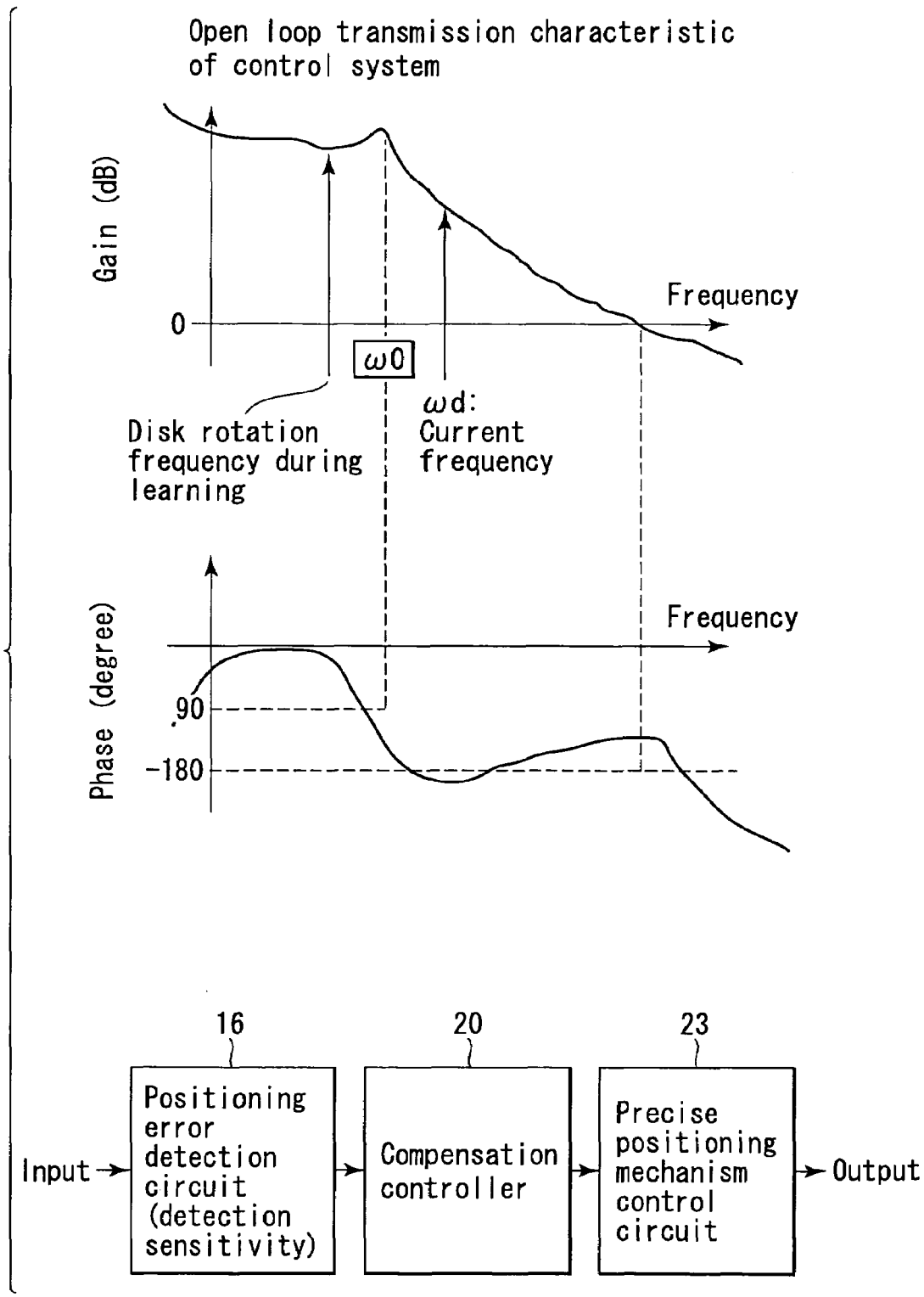
FIG. 7 is a graph for explaining a relationship between a servo gain and a phase according to the first embodiment of the present invention.
Figure 8:
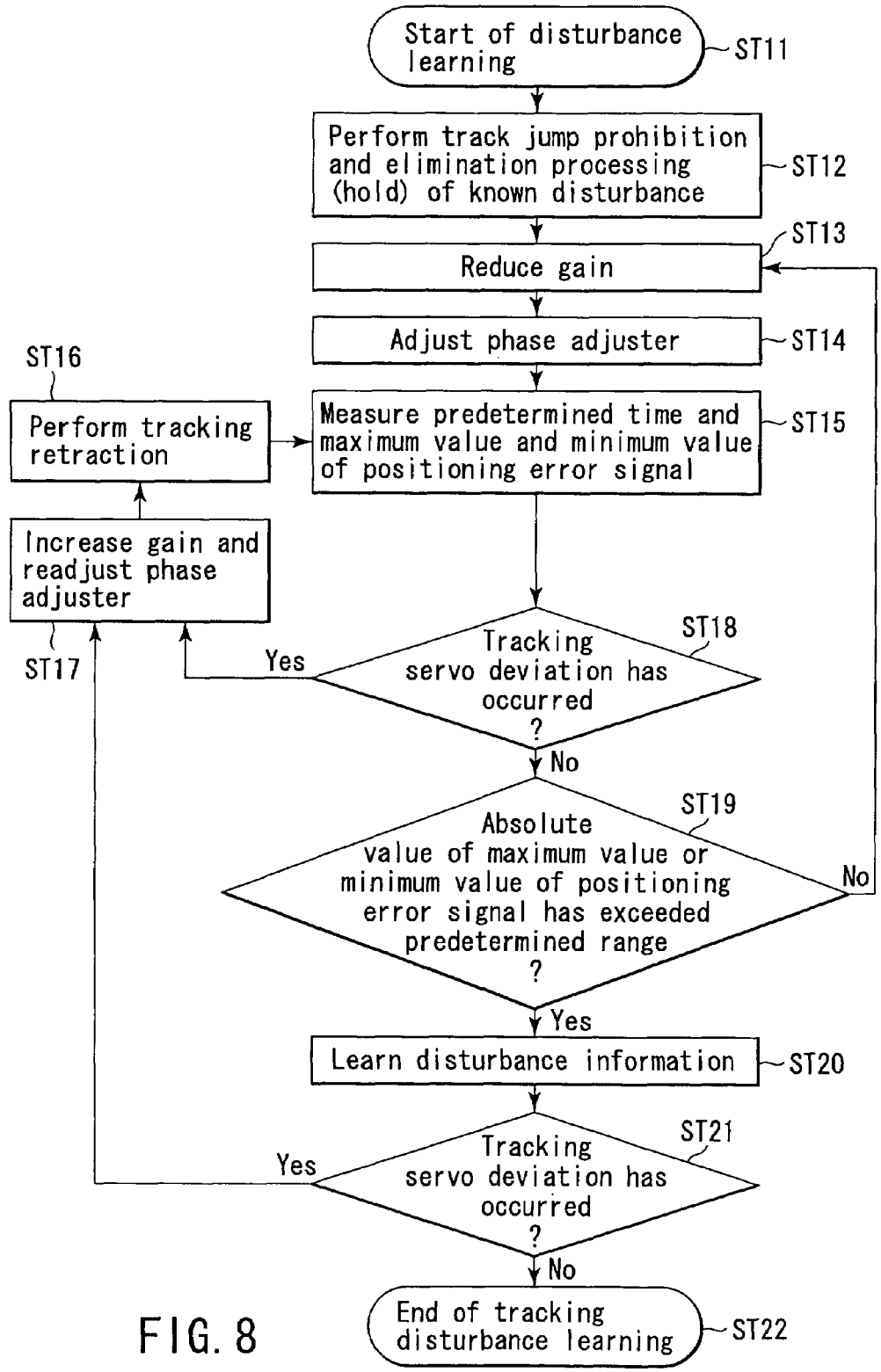
FIG. 8 is a flow chart for explaining in detail a disturbance learning process of a tracking disturbance in the optical disk device according to the first embodiment of the present invention.
Figure 9:
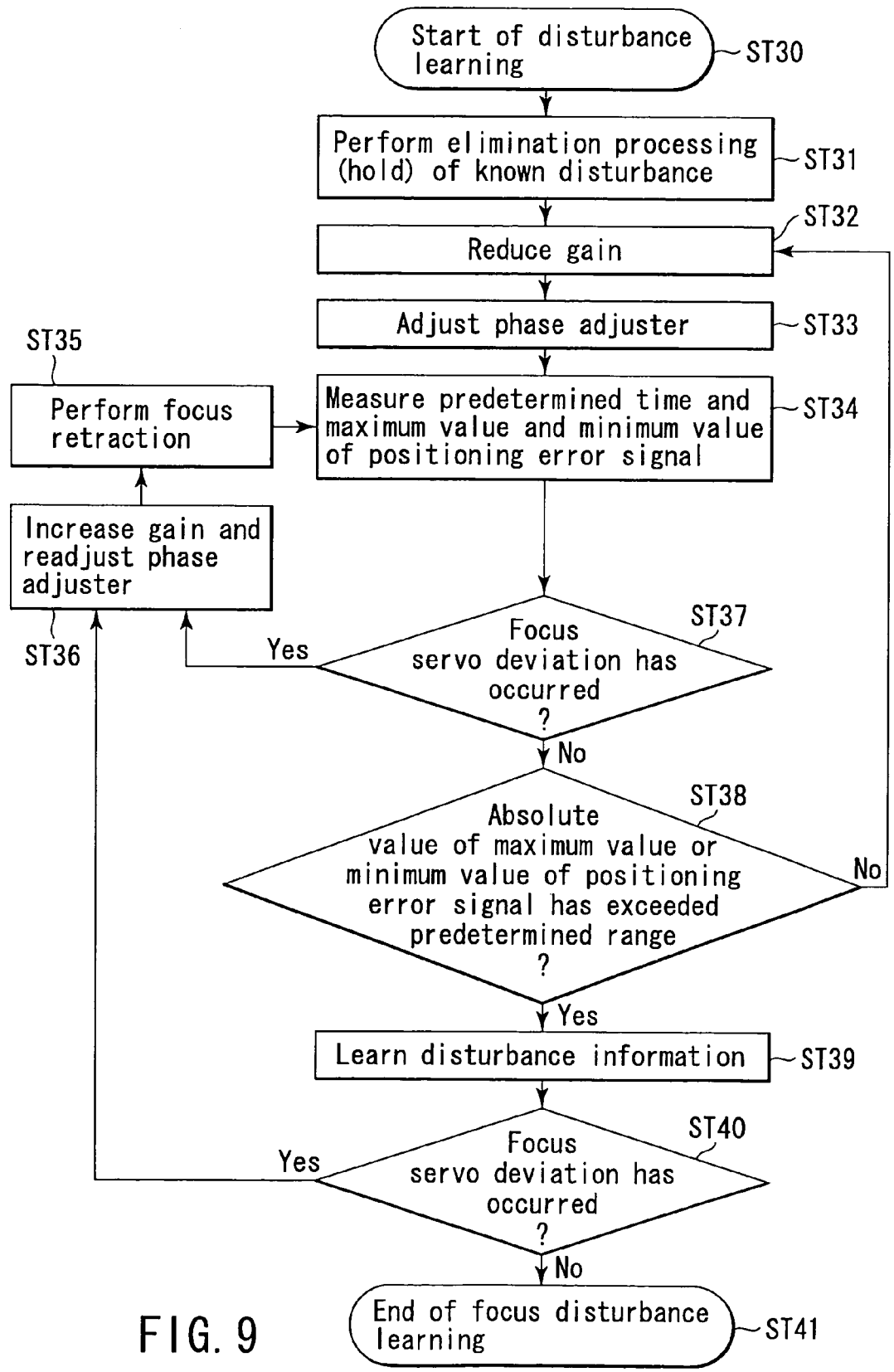
FIG. 9 is a flow chart for explaining in detail a disturbance learning process of a focus disturbance in the optical disk device according to the first embodiment of the present invention.
Figure 10:
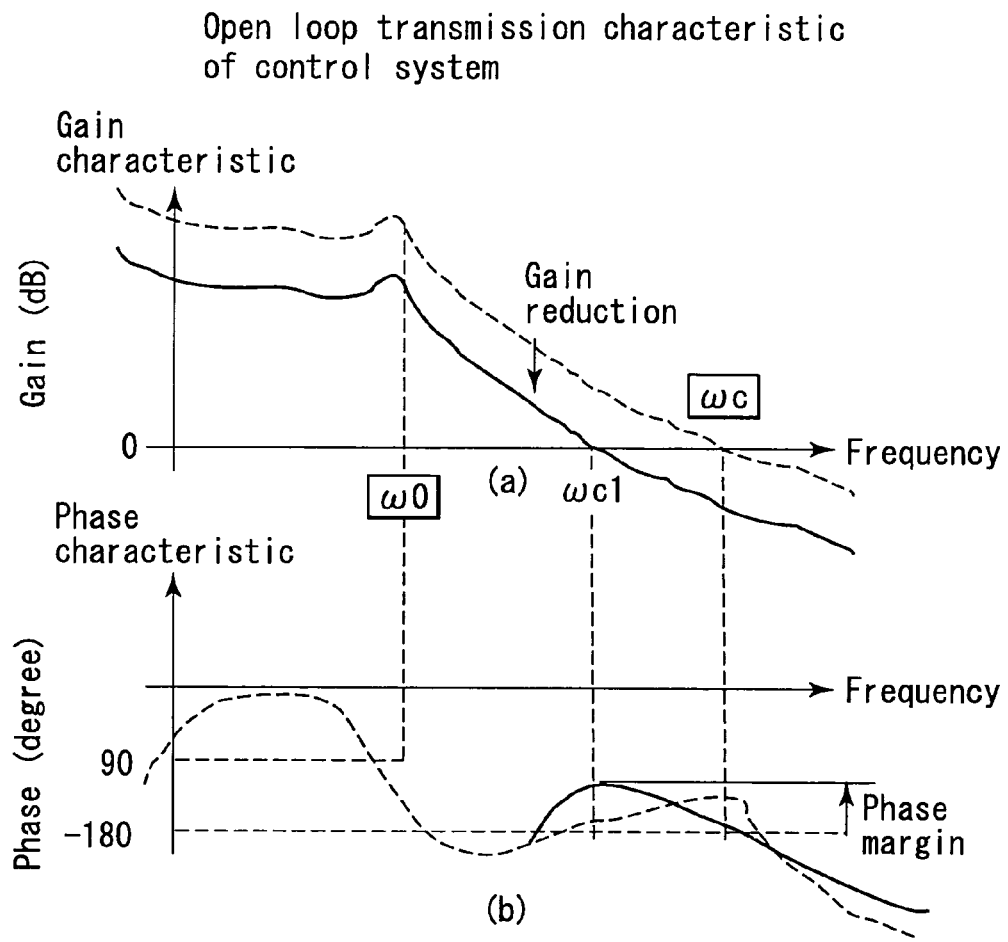
FIG. 10 is a graph for explaining a relationship between a servo gain and a phase according to the first embodiment of the present invention.
Figure 11:
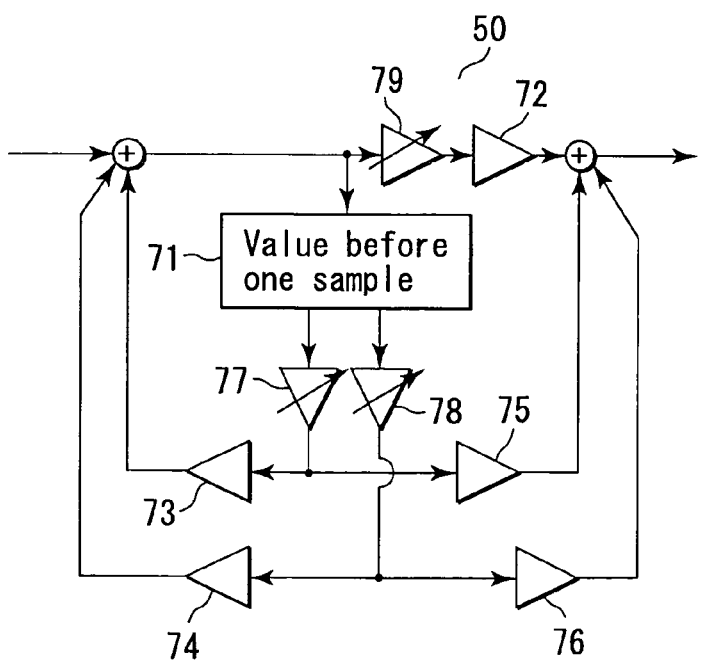
FIG. 11 is a block diagram showing an example of a configuration of a phase adjuster in the optical disk device according to the first embodiment of the present invention.

The first embodiment is a basic embodiment of the present invention, and provides an optical disk device for reducing a compensation gain of focus control or tracking control during disturbance learning of an optical disk, thereby precisely detecting a fine disturbance. FIG. 6 is a flow chart for explaining a disturbance learning process of the optical disk device according to the first embodiment of the present invention. FIG. 7 is a graph for explaining a relationship between a servo gain and a phase. FIG. 8 is a flow chart for explaining in detail a disturbance learning process of a tracking disturbance. FIG. 9 is a flow chart for explaining in detail a disturbance learning process of a focus disturbance. FIG. 10 is a graph for explaining a relationship between a servo gain and a phase. FIG. 11 is a block diagram for explaining an example of a configuration of a phase adjuster in the optical disk device according to the first embodiment of the present invention.

(Outline of Disturbance Learning Process According to the Present Invention)

An outline of a disturbance learning process according to the present invention will be described. The disturbance learning process according to the present invention has focus disturbance learning and tracking disturbance learning. After both of these learning processes have been carried out, precise focus control or tracking control based on disturbance information can be carried out based on the obtained focus learning disturbance information and tracking learning disturbance information. However, even if either of the two disturbance learning processes is carried out, precise control based on the learned disturbance information is enabled, and it is not always mandatory to carry out these processes at the same time.

In addition, in principle, it is desirable that the disturbance learning according to the present invention is carried out when the optical disk device does not carry out a recording process and a reproduction process. However, this does not mean that disturbance learning cannot be carried out at the same time with the recording process and the reproduction process.

Now, a description will be given with respect to a case where a tracking disturbance learning process is carried out after the focus disturbance learning process. When an optical disk "d" is inserted into the optical disk device, a focus search operation for detecting a focus error signal has been carried out by driving the objective lens positioning mechanism, and then focus positioning is achieved for an arbitrary information recording layer. After this focus positioning control has been carried out, a disturbance learning controller in a focus direction functions.

Now, a description will be given with respect to a learning sequence of disturbance information using the disturbance learning controller of the present invention. In general, immediately after the optical disk has been inserted, the optical head 10 is. positioned at the inner periphery side of the optical disk. In the state in which the optical head is positioned at the inner periphery side, in the case where an information recording/reproduction operation is not requested immediately, learning of disturbance information in the focus direction is carried out according to the following sequence.

The learning of disturbance information in the focus direction is carried out by the gain adjuster 18 and the compensation controller 20 by reducing a gain of a positioning control system, in particular, a gain in the vicinity of the disk rotation number. The gain to be reduced at this time is determined depending on a disturbance state. In the state in which the optical head is controlled to be positioned at the internal periphery side, a axial runout which causes a disturbance of focus positioning control does not have a large disturbance, thus making it possible to reduce the gain up to a comparatively small gain. However, at this time, it is required to set the gain at a value such that focus positioning is not deviated. As long as an ideal state with small disturbance is established, it is possible to reduce a gain up to a control system having a suppression rate of about 60 dB at least in the vicinity of the disk rotation frequency.

At this time, since the suppression rate in the vicinity of the disk rotation frequency is set to about 80 dB in a general focus positioning control system, the gain is set to about 1/10. This adjustment is achieved by the gain adjuster 18 by repeatedly carrying out a work of setting the gain to about 70%. As a result, the gain of 1/10 is obtained by repeating this work six times, and a positioning error is increased to about 10 times. However, the limit of this reduction is determined while confirming that the focus positioning error is within a predetermined value. In the case where the predetermined value is exceeded, gain limiting is stopped.

In the state in which the gain is thus lowered, the filter circuit 51 passes a low pass frequency component, in particular, only a disturbance component of a rotation cycle. This disturbance component is sampled at an output timing of the rotation angle encoder 26 provided at the spindle motor 2 to be input and stored in the temporary storage circuit 52. This sampling is carried out with precision of the rotation angle encoder 26. Filter characteristics of the filter circuit 51 are adaptively adjusted by the learning coefficient setting circuit 55 based on information in the interval counter 54 which measures an interval of the output of the rotation angle encoder 26. Specifically, when an interval of the encoder output increases, it is possible to determine that the disk rotation frequency is reduced, so that the filter cutoff frequency is also set at a low value. In addition, at the same time, in the learning coefficient setting circuit 55, a determination is made as to whether or not the disk rotation frequency measured by the interval counter 54 is higher than a main resonance frequency $\omega 0$ of the objective lens positioning mechanism 6.

Since the disturbance information stored in this temporary storage circuit 52 is obtained as a value sampled by an output of the rotation angle encoder 26, if the rotation angle encoder has a resolution of outputting 12 pulses per one rotation of the disk, the encoder stores 12 items of data. The disturbance information stored in this temporary storage circuit 52 is particularly divided into phase information for determining a disturbance phase and amplitude information. As axial runout disturbance information corresponding to one rotation of the disk, a value of the gain adjuster 18 and a value of the disk rotation frequency (rotation number of the spindle motor 2) are stored together in the disturbance learning storage device 25.

In this manner, with the disturbance learning controller 19 according to the present invention, sensitivity is improved by reducing the compensation gain of the positioning control system and disturbance information is stored, thus making it possible to store disturbance information with high precision.

After disturbance information in the focus direction has been learned as described above, the learning of disturbance information in the tracking direction is carried out. In a state in which focus control is provided, when an operation of retracting an arbitrary track is carried out, a track positioning control system enters its operated state. In this state, as is the case with the focus control system, the gain of the compensation controller 20, in particular, a gain of a low pass compensation filter when the low pass compensation filter is individually provided is reduced by the gain adjuster 18 in stepwise manner. The limit of this reduction is determined while confirming that the track positioning error is within a predetermined value. If the predetermined value is exceeded, the gain adjustment is stopped and the learning of tracking disturbance information is carried out as is the case with focus disturbance learning. Since the operation in this case is identical to the case of the focus disturbance information learning, a detailed description thereof will be omitted.

Further, in the case where a target optical disk has a plurality of information recording layers, the learning of disturbance information in the tracking direction is particularly carried out for the respective information recording layers.

In the case where the disturbance information learning in the focus direction described above has been carried out at the inner periphery of the disk, it is possible to employ a configuration in which the learning of focus control disturbance information is similarly carried out at the outer periphery as well. In this case, it is possible to arithmetically estimate focus disturbance information at an arbitrary radial position based on the leaned disturbance information at the inner and outer peripheries.

A description is given for the optical disk having a single spiral groove structure in the above, but also in the case where disturbance information is learned for an optical disk having a land & groove structure, the learning can be carried out according to the completely identical sequence.

(Control Operation Based on Leaning Disturbance Information)

The learning disturbance information obtained as described above is used as information for monitoring disturbance information learned by the temporary storage circuit 52 in the case where a control compensation mode based on disturbance leaning is set. Disturbance information stored in the temporary storage circuit 52, which is sampled at an output timing of the rotation angle encoder 26, is output via the gain corrector 53 in synchronization with rotation of the optical disk "d". A description will be given with respect to this monitoring operation and an operation of the gain corrector 53 when the disturbance control compensation mode is set.

At first, when a control compensation mode based on disturbance learning is set, the gain adjuster 18 is set at a high gain which should be essentially set. When a leaning control operation in a focus control system is described, the focus positioning error is obtained as a small value at this time, and is detected by the positioning error detection circuit 16 to be input to the addition determination circuit 17. On the other hand, a positioning error quantity passing through the addition determination circuit 17 is input to the gain adjuster 18. The positioning error quantity before one rotation of this disk is sampled at an output timing of the rotation angle encoder via the filter circuit 51 to be stored in the temporary storage circuit 52. In the disturbance control compensation mode, the disturbance information before one rotation of the disk, which is stored in this temporary storage circuit 52, is added by the addition determination circuit 17 via the gain corrector 53. In the disturbance learning control mode, disturbance learning control is carried out according to this sequence.

At this time, an output interval of the rotation angle encoder is measured by the interval counter. In the case where it is determined that this measured interval is obtained as a value different from the interval stored in the disturbance learning storage device 25, it is determined that the disk rotation number has changed, so that the gain of disturbance information input to the addition determination circuit 17 is corrected by the gain corrector 53. This correction operation is carried out based on the determination as to whether the disk rotation frequency is large or small with respect to the previously stored main resonance frequency $\omega 0$ of the objective lens positioning mechanism 6. In the case where it is determined that the disk rotation frequency is larger, a value obtained as $\omega d^2/\omega 0^2$ times based on a relationship between the measured rotation frequency $\omega d$ and the main resonance frequency $\omega 0$ of the positioning mechanism is corrected by adding to the previous gain value. On the other hand, in the case where it is determined that the disk rotation frequency is lower than the main resonance frequency $\omega 0$, gain correction is not carried out.

Further, here, there can be provided an optical disk apparatus which stores the learning disturbance information in plurality of areas corresponding to each rotation frequency respectively, and while it uses the learning disturbance information, reads the learning disturbance information selectively from the area corresponding to each rotation frequency, for gain controlling.

(Rotation Information Detector)

In addition, in the optical disk device shown in FIG. 1, a detector 41 for rotation information in a data signal may be provided instead of the rotation angle encoder 26 as shown in FIG. 5. This rotation information detector 41 detects rotation information from a detection signal detected by the optical head 10, and the disturbance learning controller 19 or the disturbance leaning storage device 25 carries out disturbance information learning at a timing given by this rotation information. Since the encoder 26 may not be provided, a mechanical burden is reduced and a cost of parts can be reduced.

(Flow Chart of Disturbance Learning Process According to the Present Invention)

Now, an operation of the above disturbance learning process will be further described in detail by using three flow charts. FIG. 6 is a flow chart for explaining a disturbance leaning process of the optical disk device according to the first embodiment of the present invention. FIG. 7 is a graph for explaining a relationship between a servo gain and a phase. FIG. 8 is a flow chart for explaining in detail a disturbance learning process of a tracking disturbance. FIG. 9 is a flow chart for explaining in detail a disturbance leaning process of a focus disturbance.

An outline of the disturbance leaning process according to the present invention will be described by way of flow charts. In the flow chart of FIG. 6, when a waiting instruction such as a pause mode is issued from the system side (ST1), a mode for starting disturbance learning is set (ST2). When this mode in which this disturbance learning is carried out is set, information on tracking disturbance is first learned (ST3), and a determination is made as to whether or not a target disk is a double-layered disk (ST4). In the case where the target disk is a single layer disk, the learned tracking disturbance information is stored together with information on the disk rotation frequency during learning (ST5). In addition, in the case where the target disk is a double-layered disk, the learned tracking disturbance information is stored as tracking disturbance information on the corresponding layer in a storage region corresponding to a layer in which this learning has been carried out (ST10).

Thereafter, in the case where focus disturbance information learning is carried out continuously, tracking control is turned OFF, and a state in which tracking control is not provided is established (ST6). In this state, focus disturbance information is learned (ST7), the focus disturbance information is recorded together with the information on the disk rotation frequency during learning (ST8), and the disturbance learning process is terminated (ST9).

The reason why the disk rotation frequency is recorded together when the disturbance learning process is carried out is that, as shown in FIG. 7, open loop characteristics of the tracking and focus control systems each have a gain which differs depending on the frequency. Therefore, in the case where the disk is rotated at a frequency (for example, $\omega d$ in the figure) higher than the main resonance frequency $\omega 0$ of a positioning actuator, it is required to carry out compensation of the learning disturbance information according to the above rotation frequency.

(Flow Chart of Tracking Disturbance Learning Process and Focus Disturbance Learning Process According to the Present Invention)

The above tracking disturbance learning process and focus disturbance learning process will be described in detail with reference to the flow charts of FIG. 8 and FIG. 9.

In tracking disturbance learning, as shown in the flow chart of FIG. 8, when learning is started at first (ST11), a track jump is prohibited and a trace mode in conformance with the track is established, and at the same time, the elimination process of the known disturbance is carried out (ST12). The known disturbance denotes a disturbance caused by address information embedded in the disk. The above process is carried out in order to eliminate information other than eccentricity disturbance of frequency synchronization, such as track jump or address information disturbance. After this process has been carried out, a tracking servo gain is reduced by the gain adjuster 18 (ST13).

Further, in this state in which the gain is reduced, a parameter for phase compensation of some kHz in the vicinity of a control bandwidth is adjusted by the phase adjuster 50 in order to stably maintain a phase margin (ST14). As shown in FIG. 10, the gain (solid line) reduced by the gain adjuster 18 has a value indicating its phase (dashed line in the lower graph) in the vicinity of −180 degrees and a phase margin is eliminated, which causes an unstable operation. Here, phase compensation in correspondence to the gain reduction is carried out by the phase adjuster 50, thereby making it possible to reduce only the DC gain while maintaining the phase margin.

When phase adjustment is thus carried out by the phase adjuster 50, a maximum value and a minimum value of a positioning error signal are sampled for a predetermined time (ST15). It is desirable that this sampling is carried out by one or more rotations of the disk, but it is possible to set the sampling for ½ rotation in order to reduce a measurement time. In this manner, the maximum value and the minimum value of the positioning error signal are measured. At this time, if tracking control is deviated, the gain is excessively reduced. In this case, the gain is increased again, the phase adjuster 50 is adjusted again (ST17), and retraction of tracking control (ST16) is carried out, so that the maximum value and the minimum value of the positioning error signal are measured again. During this measurement period, when it is confirmed that tracking control is not deviated (ST18), a determination is made as to whether or not an absolute value of the maximum value or the minimum value of the positioning error signal exceeds a predetermined range (ST19). If it is determined that the predetermined range is exceeded, it is determined that a condition under which disturbance information can be detected with a high S/N ratio is met. It is desirable that the predetermined range for carrying out this determination is set to about ¼ to ½ of the maximum value which can be taken as a positioning error signal.

According to the procedure shown in such a flow chart, disturbance leaning is learned under a condition under which tracking disturbance is detected at a high S/N ratio (ST20). During this tracking disturbance learning, in the case where tracking control is deviated (ST21), the process returns to step (ST17) in which the gain is increased again, where learning is carried out. If tracking control is not deviated, the tracking disturbance learning is terminated (ST22).

Similarly, focus disturbance information is learned according to the flow chart shown in FIG. 9. In other words, in focus disturbance learning, when leaning is first started as shown in the flow chart of FIG. 9 (ST30), the elimination process of the known disturbance is carried out (ST31). After this process has been carried out, the focus servo gain is reduced by the gain adjuster 18 (ST32).

Further, in this state in which the gain is reduced, a parameter for phase compensation of some kHz in the vicinity of a control bandwidth is adjusted by the phase adjuster 50 so as to stably maintain a phase margin (ST33).

When phase adjustment is carried out by the phase adjuster 50, the maximum value and the minimum value of the positioning error signal are sampled for a predetermined time (ST34). It is desirable that this sampling is carried out by one or more rotations of the disk, but it is possible to set this sampling for ½ rotation in order to reduce a measurement time. The maximum value and the minimum value of the positioning error signal are measured in this manner. At this time, if focus control is deviated, a gain is excessively reduced. In this case, the gain is increased again, the phase adjuster 50 is adjusted again (ST36), and retraction of focus control (ST35) is carried out, so that the maximum value and the minimum value of the positioning signal are measured again.

During this measurement period, when it is confirmed that focus control is not deviated (ST37), a determination is made as to whether or not an absolute value of the maximum value or the minimum value of the positioning error signal exceeds a predetermined range (ST38). If it is determined that the predetermined range is exceeded, it is determined that a condition under which disturbance information can be detected at a high S/N ratio is met. It is desirable that the predetermined range for carrying out this determination is set to about ¼ to ½ of the maximum value which can be taken as a positioning error signal.

According to the procedure shown in such a flow chart, disturbance information is learned under a condition under which focus disturbance is detected at a high S/N ratio (ST39). During this focus disturbance leaning, in the case where focus control is deviated (ST40), the process returns to step (ST36) in which a gain is increased again, where learning is carried out. If tracking control is not deviated, the focus disturbance leaning is terminated (ST41).

The above operation of the phase adjuster 50 can be achieved with a digital filter structure having a variable gain as shown in FIG. 11. In general, a phase compensator is composed of a digital filter, and is often configured to be connected in series.

In FIG. 11, the phase adjuster 50 achieves predetermined phase compensation with gain elements 72, 73, and 75. A phase compensator for gain characteristics after changed is set to be achieved by other gain elements 72, 74, and 75. Here, variable gain elements 77 and 78, and 79 are changed, thereby making it possible to smoothly change predetermined phase compensation characteristics to optimal phase compensation characteristics after the gain has been changed. During this change, the variable gain elements 77 and 78 complementarily change each other. When one element is set to "1", the other element is changed to be "0". In addition, the variable gain element 79 is adjusted according to a change in the variable gain elements 77 and 78.

<Second Embodiment>

Figure 12:
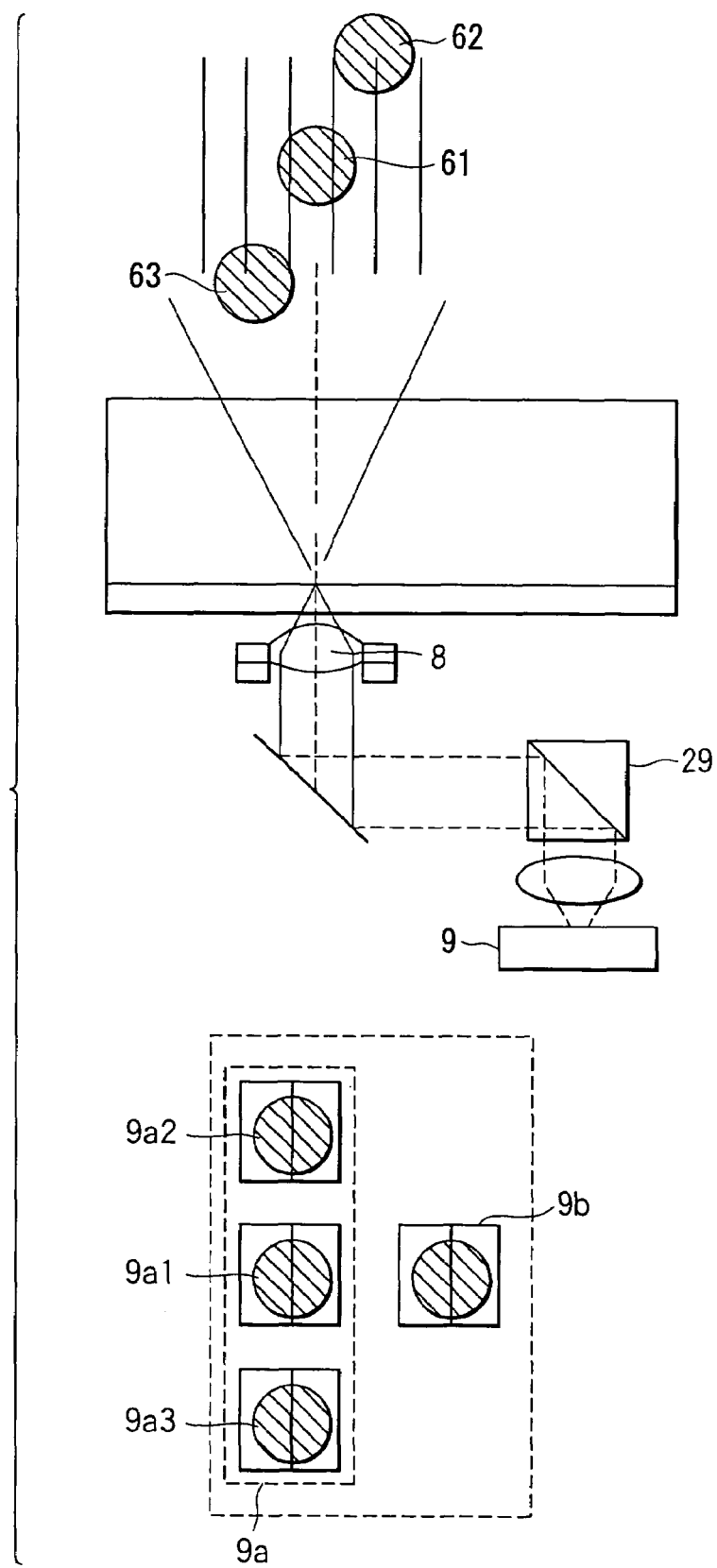
FIG. 12 is a diagram showing an example of optical spots in an optical disk device according to a second embodiment of the present invention.
Figure 13:
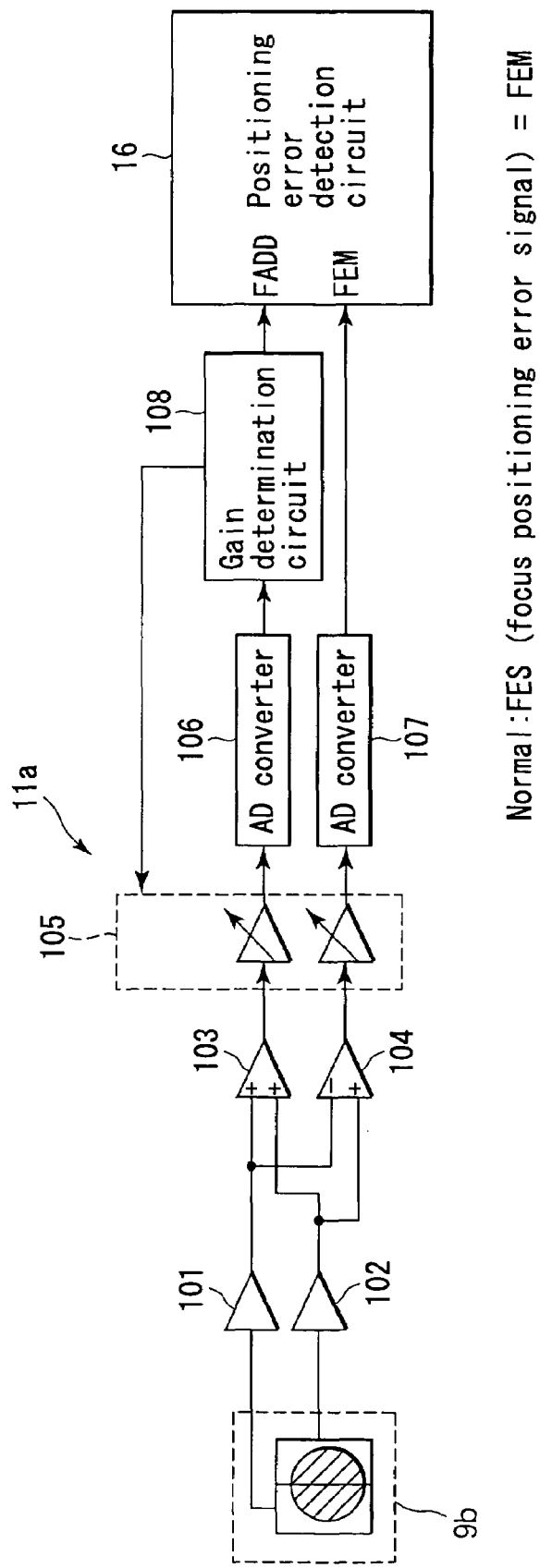
FIG. 13 is a block diagram showing an example of a configuration of a gain adjuster for eliminating an effect caused by recorded region/unrecorded region from learning disturbance information in the optical disk device according to the second embodiment of the present invention.
Figure 14:
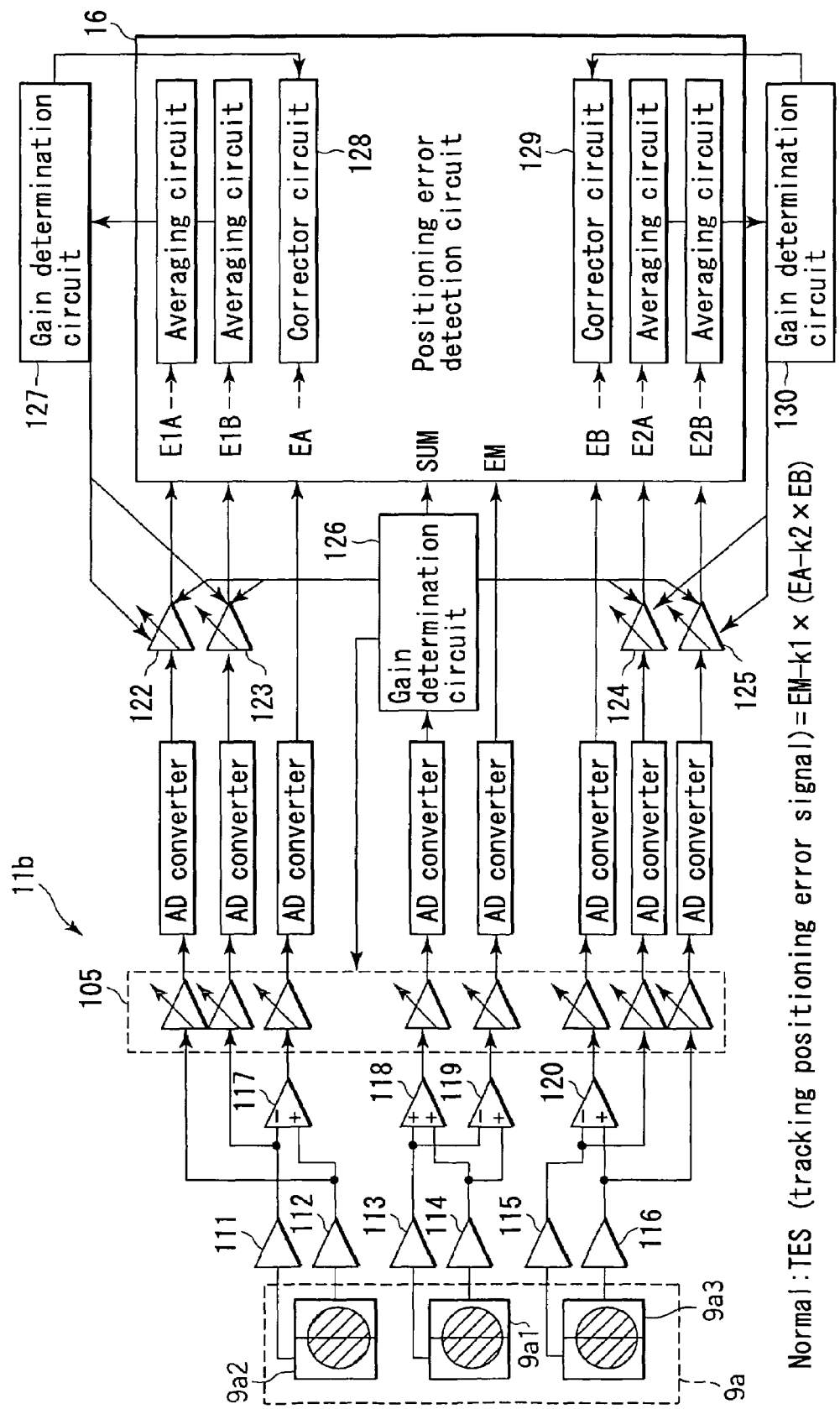
FIG. 14 is a block diagram showing an example of the configuration of the gain adjuster for eliminating an effect caused by recorded region/unrecorded region from learning disturbance information in the optical disk device according to the second embodiment of the present invention.
Figure 15:
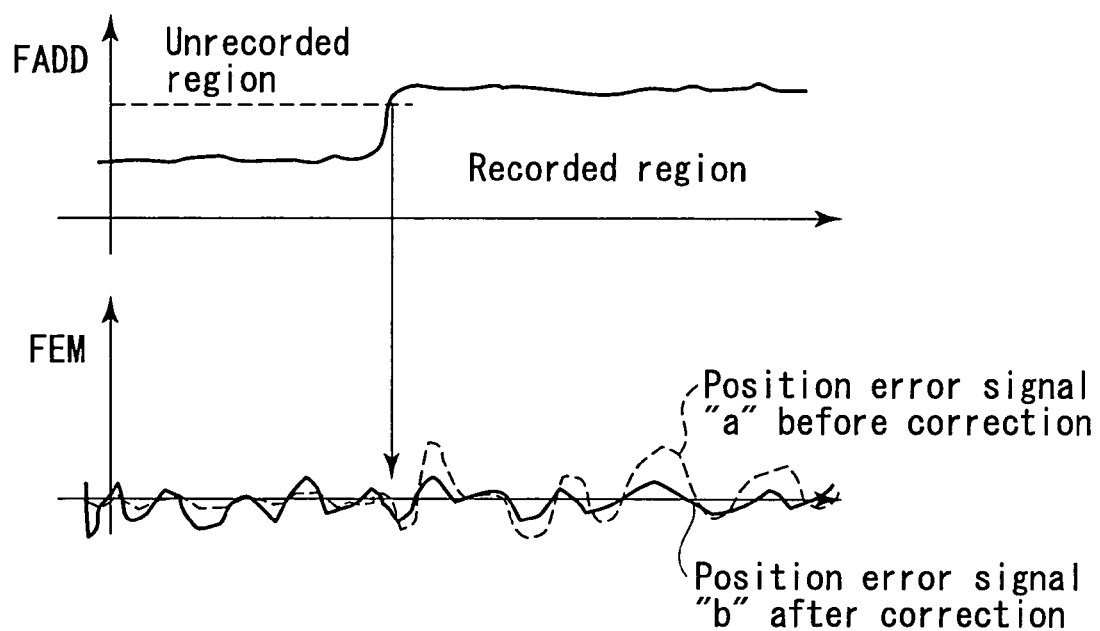
FIG. 15 is a graph showing a process of the gain adjuster in which an effect caused by recorded region/unrecorded region is eliminated from learning disturbance information in the optical disk device according to the second embodiment of the present invention.

A second embodiment provides an optical disk device having a gain adjuster which functions to compensate for a disturbance information change which derives from a difference or the like between reflection indexes of a recorded region and an unrecorded region in a recording type optical disk. FIG. 12 is a diagram showing an example of optical spots of the optical disk device according to the second embodiment of the present invention. FIG. 13 and FIG. 14 are block diagrams each showing an example of a configuration of a gain adjuster for eliminating an effect caused by recorded region/unrecorded region from learning disturbance information. FIG. 15 is a graph showing a process of the gain adjuster when the effect caused by recorded region/unrecorded region is eliminated from learning disturbance information.

In a recording type optical disk, in the unrecorded region and the recorded region of the recording layer, the reflection indexes differ depending on disk characteristics. There are two disk characteristics, i.e., a characteristic in which the reflection index is reduced by data recording such as DVD-RAM or the like and a characteristic in which the reflection index is increased by such recording. A change in this reflection index is generally greater than twice or half thereof. Now, a case in which the reflection index is increased by recording will be described. In the upper graph shown in FIG. 15, the gain is entirely small in the unrecorded region, and the gain is entirely large in the recorded region. In this manner, as shown in the lower graph of FIG. 15, a value of a position error signal "a" (dashed line) including disturbance information is small in the unrecorded region, and is large in the recorded region.

The position error signal "a" is corrected by the working of the gain adjusters 11a and 11b shown in FIG. 13 and FIG. 14 according to the second embodiment, whereby an effect caused by the unrecorded region and the recorded region is eliminated as a position error signal "b" (solid line). In this manner, the position error signal "b" is produced as a signal indicating only a disturbance component, and a reliable control operation based on precise learning disturbance information can be carried out.

As shown in FIG. 12, the photo-detector 9 of the optical disk device according to the present invention is composed of a two-division PD (photo-detector) 9a for tracking error detection and a two-division PD 9b for focus error detection.

(Compensation Process for Focus Error)

First, the output compensation process of the PD 9a for focus error detection will be described. The gain adjuster 11a shown in FIG. 13 has the following configuration for the compensation process. In other words, IV conversion is carried out by gain elements 101 and 102 which receive a signal from the photodetector 9b, and then the converted signal is input to a variable gain element group 105 via an adder circuit 103 and a differential circuit 104. An addition signal and a differential signal output from the variable gain element group 105 are inserted into AD converters 106 and 107. In particular, the AD conversion result of the addition signal is further input to a gain change determination circuit 108.

This gain change determination circuit 108 functions so as to monitor an average value of the addition signal, to detect a gain change as shown in FIG. 15, and to change the gain in the variable gain element group according to the change. By such an operation, a focus position error signal "a" (FEM) (dashed line) for carrying out focus control is produced as a position error signal "b" (solid line), and an effect caused by the unrecorded region and the recorded region is eliminated. Thereby, the position error signal "b" is produced as a signal indicating only a disturbance component, and a reliable control operation can be carried out based on precise learning disturbance information.

(Compensation Process for Tracking Error)

Similarly, with respect to the PD 9a for tracking error detection, the gain change depending on the recorded or unrecorded state can be compensated for by the gain adjuster 11b shown in FIG. 14. In tracking error detection, an error signal is obtained by an arithmetical process using three two-division PDs. In other words, in the gain adjuster 11b for carrying out the tracking error compensation process, as shown in FIG. 14, an error signal is obtained by an arithmetical operation from a differential signal in a first two-division PD 9a1, and a differential signal of a respective one of a second two-division PD 9a2 and a third two-division PD 9a3. At this time, the second PD 9a2 or the third PD 9a3 is greatly affected by the recording state of the optical disk.

As shown in FIG. 12, this is because optical spots detected by three tracking PDs are focused after being offset as in optical spots 61, 62, and 63, respectively, and the optical spot 62 or the optical spot 63 is formed in the boundary region between the recorded region and the unrecorded region.

In order to avoid such effect of gain change depending on the optical disk recording state, the gain adjuster 11b of the tracking error signal carries out IV conversion by gain elements 113 and 114 which receive a signal from the photo-detector 9b as is the case with the focus error signal. Then, the converted signal is input to the gain element group 105 via an adder circuit 118 and a differential circuit 119. Then, a gain change is detected by a gain determination circuit 126 based on a signal obtained by the adder 118, and the variable gain element group 105 is adjusted according to the detection result, whereby an input to an AD converter is adjusted so as not to be saturated.

At the same time, with respect to a signal of PD 9a2 or PD 9a3 in which a two-division PD gain balance has changed under the influence of the boundary between the recorded region and the unrecorded region, the values of the variable gain elements 122 and 123 or variable gain elements 124 and 125 are adjusted so that the gain balance is adjusted.

Specifically, after the IV conversion is carried out by the gain element 111, 112, 115, and 116 which receive a signal from the photo-detectors 9a2 and 9a3, the respective signals of the two-division PDs, which have passed through the variable gain element group 105 and the AD converter, are averaged by averaging circuits, and the averaging results are compared with each other by a gain change determination circuit 127 or a gain change determination circuit 130. Here, when it is determined that either of the outputs of the two-division PDs is eccentric, a signal obtained by converting outputs from the differential circuits 117 and 120 by the AD converter via the variable gain element group 105 is corrected by a corrector circuit 128 or a corrector circuit 129. If necessary, fine adjustment is carried out according to the gain determination circuit 127 and the gain determination circuit 130 by the variable gain elements 122 and 123 or the variable gain elements 124 and 125.

In this manner, the optical disk device having the gain adjusters 11a and 11b according to the second embodiment eliminates a change factor based on a difference in physical characteristics between the recorded region and the unrecorded region of the optical disk. As shown in the lower graph of FIG. 15, the position error signal "a" is compensated for the position error signal "b" caused by a precise disturbance component free of change, whereby proper disturbance leaning is carried out. At the same time, a precise error signal can be obtained, thus enabling stable focus control or tracking control.

<Third Embodiment>

Figure 16:
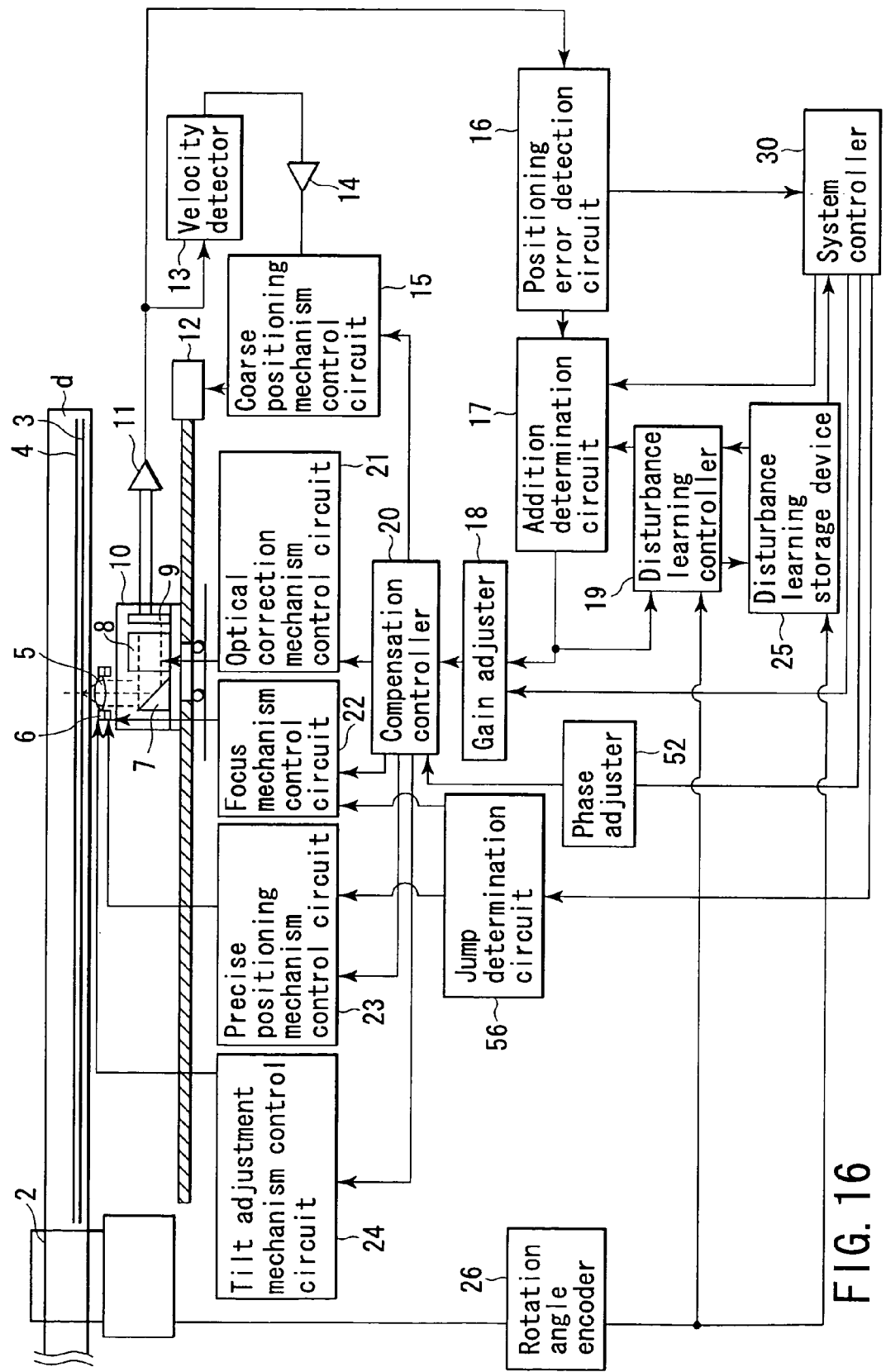
FIG. 16 is a block diagram showing an example of a configuration for jump determination using learning disturbance information of an optical disk device according to a third embodiment of the present invention.
Figure 17:
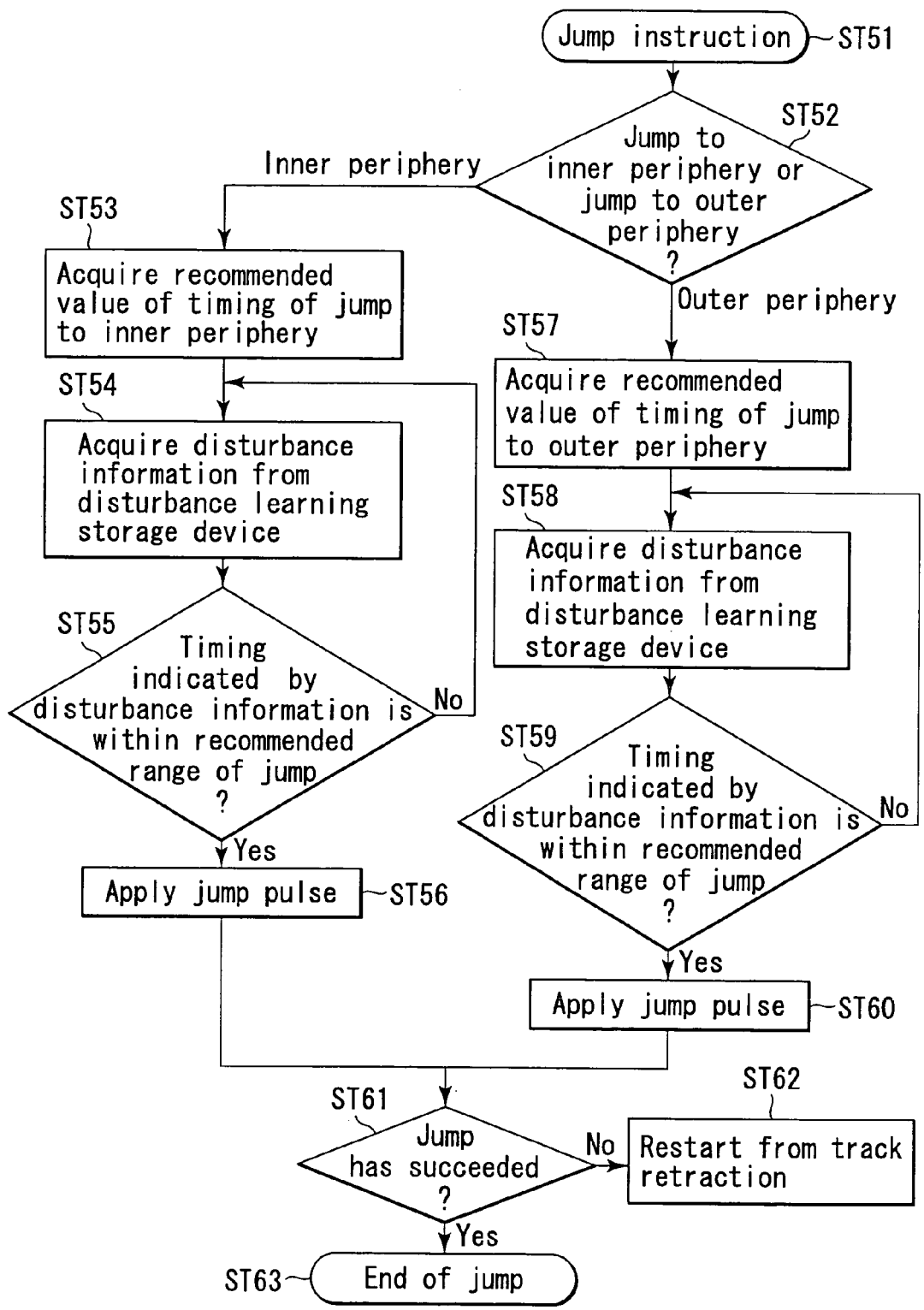
FIG. 17 is a flow chart for explaining a jump process using learning disturbance information of the optical disk device according to the third embodiment of the present invention.
Figure 18:
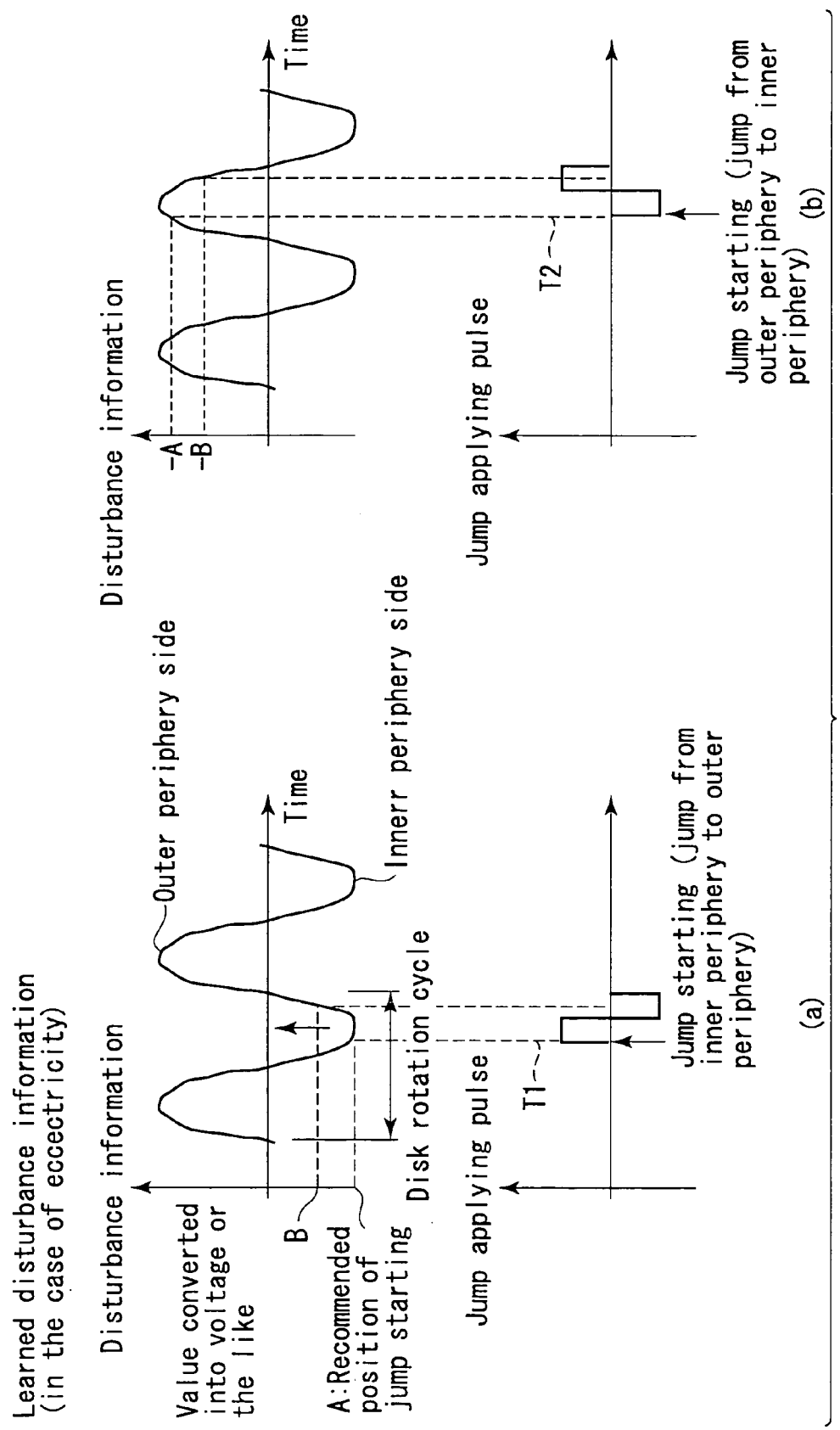
FIG. 18 is a graph and timing chart for explaining a jump process using learning disturbance information on eccentricity of the optical disk device according to the third embodiment of the present invention.
Figure 19:
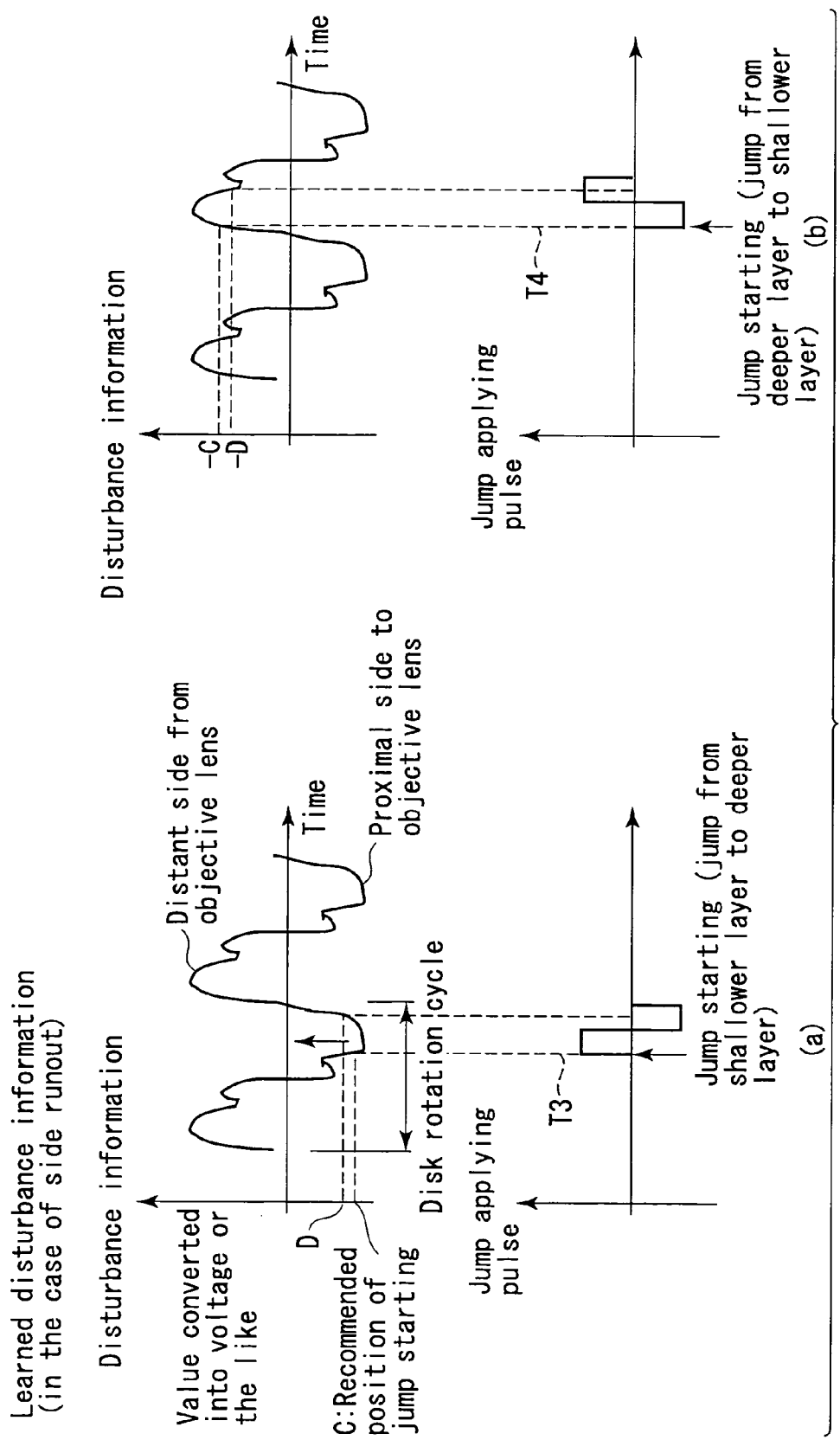
FIG. 19 is a graph and timing chart for explaining a jump process using learning disturbance information on axial runout of the optical disk device according to the third embodiment of the present invention.
Figure 20:
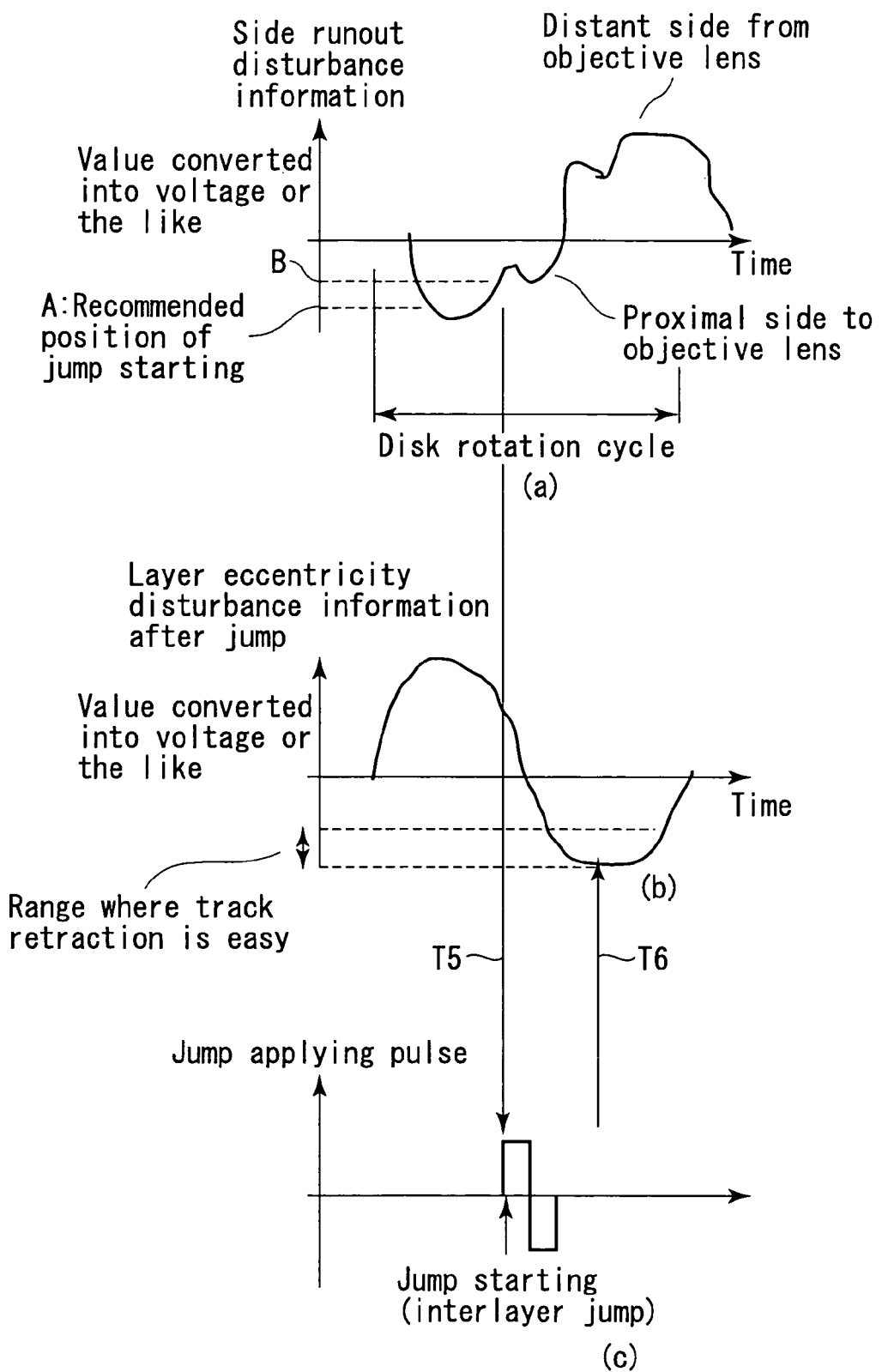
FIG. 20 is a graph and timing chart for explaining a jump process using both of the learning disturbance information on eccentricity and the learning disturbance information on axial runout in the optical disk device according to the third embodiment of the present invention.
Figure 21:
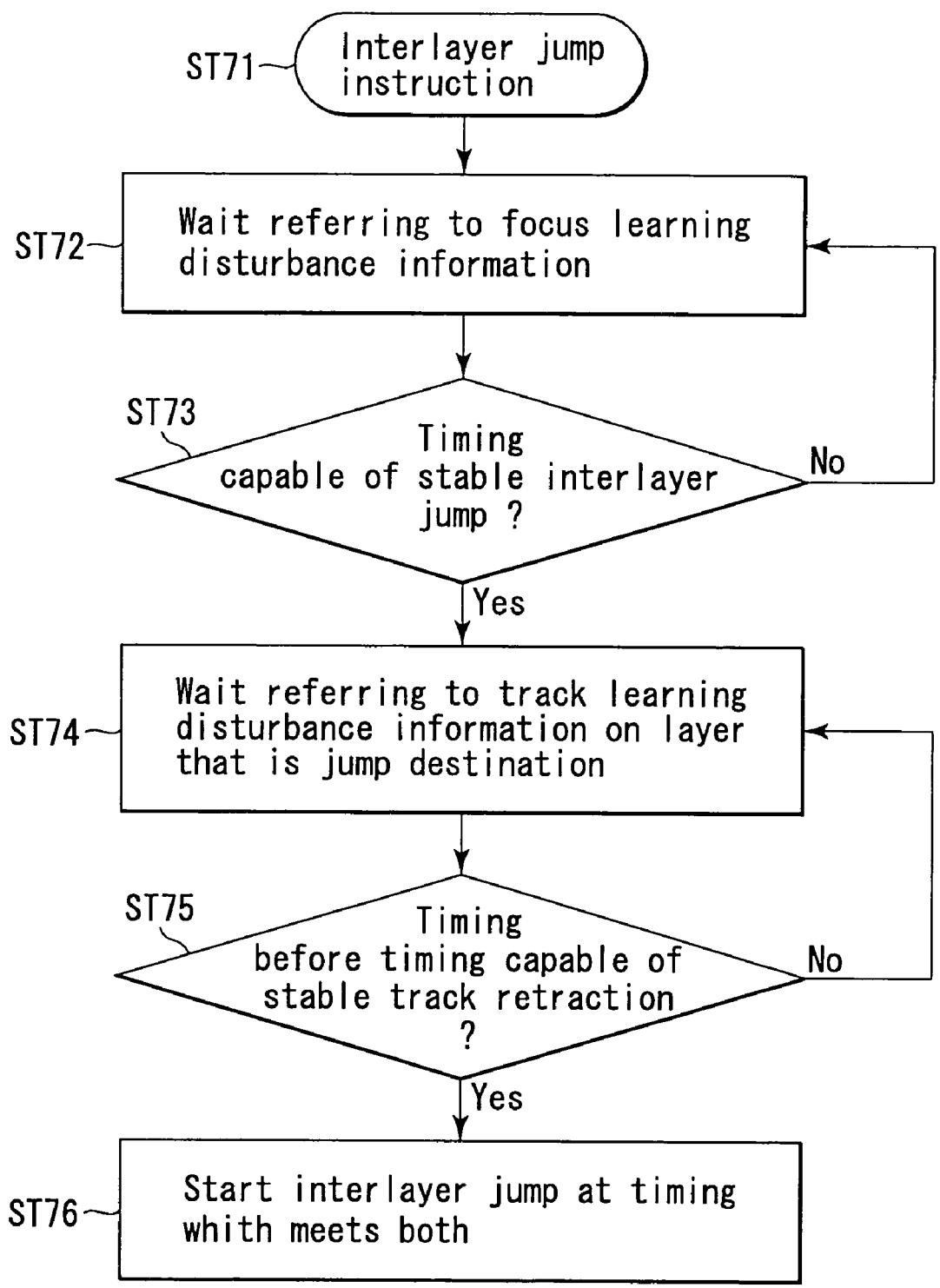
FIG. 21 is a flow chart for explaining an interlayer jump process using both of the learning disturbance information on eccentricity and the learning disturbance information on axial runout in the optical disk device according to the third embodiment of the present invention.
Figure 22:
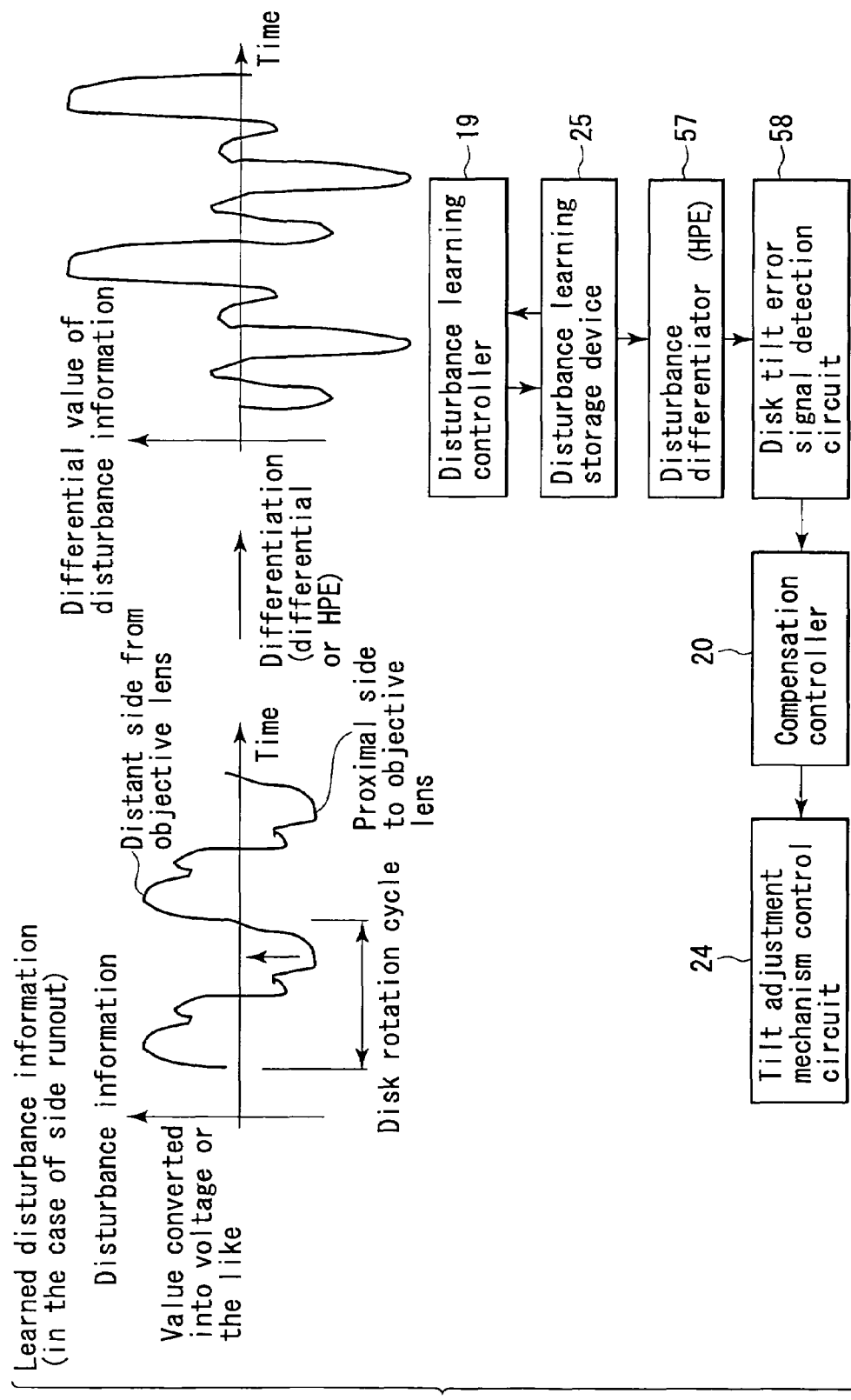
FIG. 22 is a graph and timing chart for explaining a process of carrying out tilt adjustment using learning disturbance information on axial runout in the optical disk device according to the third embodiment of the present invention.
Figure 23:
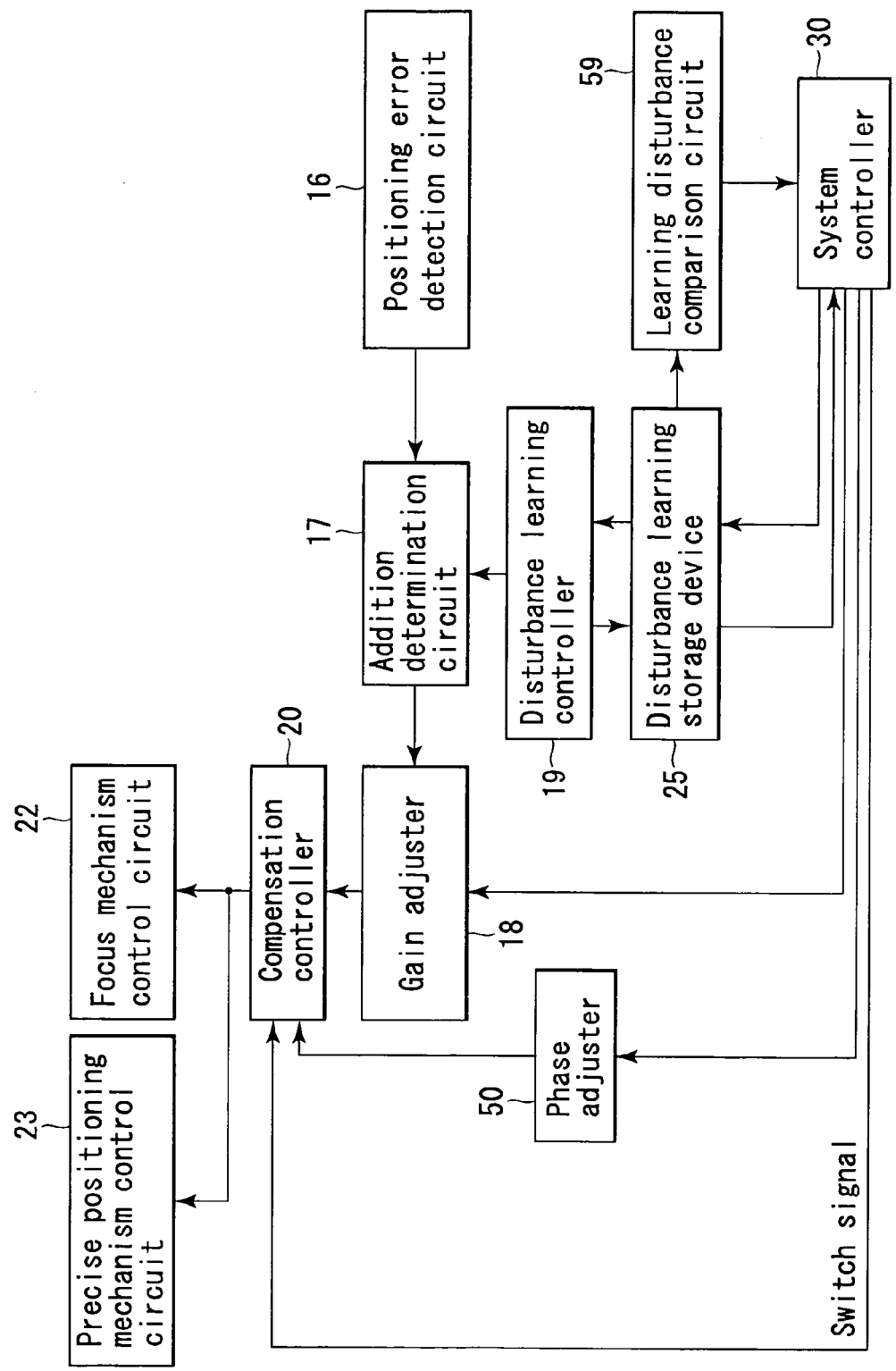
FIG. 23 is a block diagram showing an example of a configuration for acquisition and application of a servo operation using learning disturbance information and non-constant disturbance information in the optical disk device according to the third embodiment of the present invention.
Figure 24:
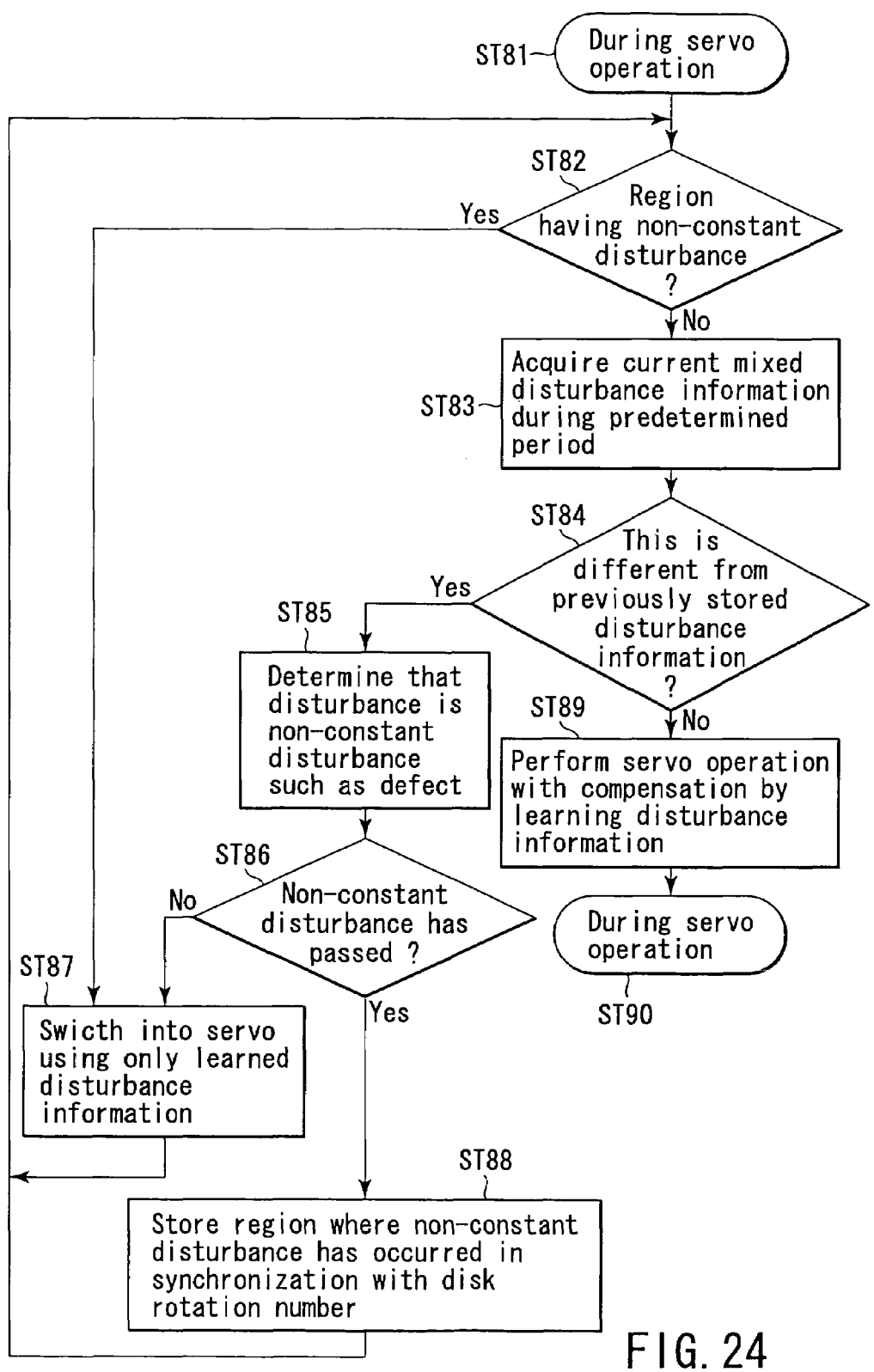
FIG. 24 is a flow chart for explaining acquisition and application of a servo operation using learning disturbance information and non-constant disturbance information in the optical disk device according to the third embodiment of the present invention.

A third embodiment provides an optical disk device for carrying out a control process by using learning disturbance information acquired according to the first embodiment and the second embodiment. FIG. 16 is a block diagram showing an example of a configuration for jump determination using learning disturbance information. FIG. 17 is a flow chart for explaining a jump process using learning disturbance information. FIG. 18 is a graph and timing chart for explaining a jump process using learning disturbance information on eccentricity. FIG. 19 is a graph and timing chart for explaining a jump process using learning disturbance information on axial runout. FIG. 20 is a. graph and timing chart for explaining a jump process using both of the learning disturbance information on eccentricity and the learning disturbance information on axial runout. FIG. 21 is a flow chart for explaining an interlayer jump process using both of the learning disturbance information on eccentricity and the learning disturbance information on axial runout. FIG. 22 is a graph and timing chart for explaining a process of carrying out tilt adjustment using learning disturbance information on axial runout. FIG. 23 is a block diagram showing an example of a configuration for acquisition and application of a servo operation using learning disturbance information and non-constant disturbance information. FIG. 24 is a flow chart for explaining acquisition and application of a servo operation using learning disturbance information and non-constant disturbance information.

The optical disk device according to the third embodiment carries out position control of at least one of an optical head and an objective lens based on the learning disturbance information acquired by the optical disk device shown in the first embodiment and the second embodiment. This enables stable position control with high precision based on precise disturbance information.

Further, in the optical disk device according to the third embodiment, as shown below, a description will be further given with respect to a jump process based on learning disturbance information, tilt adjustment of an optical disk based on the learning disturbance information, and acquisition and utilization of non-constant disturbance information such as defect based on the learning disturbance information.

(Application to Jump Timing)

In the optical disk device according to the third embodiment, as shown in FIG. 16, a jump timing is given by providing a jump determination circuit 56. In other words, the jump determination circuit 56 is provided to be connected to the system controller 30, and the learning disturbance information from the disturbance learning storage device 25 is acquired. Then, a jump timing based on the acquired information is given to the precise positioning mechanism circuit 23 and the focus mechanism control circuit 22, thereby obtaining an optimal jump timing.

(Track Jump)

A track jump process using learning disturbance information will be described by using the flow chart of FIG. 17. First, when a jump instruction is received (ST51), a determination is made as to whether the instruction is an inner periphery jump instruction or an outer periphery jump instruction (ST52). In the case of the inner periphery jump, a recommended value of a disturbance state in the case where the inner periphery jump is stably carried out is set (ST53). Thereafter, the learned disturbance information is acquired at a disk rotation cycle (ST54). When it is confirmed that disturbance information is within the range of the recommended value of the above disturbance state (ST55), a jump pulse is applied (ST56).

In other words, in the graph of disturbance information on eccentricity shown in FIG. 18, it is optimal that a jump timing is a timing with its minimal disturbance change in order to ensure stable jumping. With respect to the jump from the inner periphery to the outer periphery, in the graph and timing chart in (a) of the figure, it is preferable that a timing T1 is a timing with the most stable disturbance change and that jumping is carried out at this timing.

In other words, in the graph in (a) of the figure, it is desirable that a predetermined range of the value of disturbance information in which this timing is determined is a timing indicating a start position in the range in which a disturbance temporarily exceeds a predetermined recommended value (A) and the disturbance decreases and reaches a predetermined second value (B).

Similarly, with respect to a jump from the outer periphery to the inner periphery, in the graph and timing chart in (b) of the figure, a timing T2 is a timing with the most stable disturbance change, and jumping is carried out at this timing, whereby the most stable jump is made possible.

In the flow chart of FIG. 17, in the case where the outer periphery jump instruction is issued in step ST52, the recommended value of the disturbance state in the case where the outer periphery jump is stably carried out is set (ST57). Thereafter, the learned disturbance information is acquired at a disk rotation cycle (ST58). When it is confirmed that disturbance information is within the range of the recommended value of the above disturbance state (ST59), a jump pulse is applied (ST60).

In the case where a jump is unsuccessful (ST61), an operation is restarted from track retraction (ST62). In the case where a jump is successful, the jump process is terminated (ST63).

(Interlayer Jump)

As is the case with the above track jump, an interlayer jump in the case of a double-layered disk can also be carried out stably by using learning disturbance information. With respect to the interlayer jump, a timing is determined by using the learning disturbance information on axial runout shown in FIG. 19, or an interlayer jump timing is determined by using two items of the learning disturbance information on axial runout and the learning disturbance information on eccentricity as shown in FIG. 20.

An interlayer jump using learning disturbance information will be described by using a flow chart for explaining an interlayer jump process using both of the learning disturbance information on eccentricity and the learning disturbance information on axial runout shown in FIG. 21. If an interlayer jump instruction in the case of a double-layered disk is issued (ST71), one waits based on focus learning disturbance information (learning disturbance information on axial runout) (ST72), and it is determined that a position of achieving a stable interlayer jump is established (ST73).

In other words, in (a) of FIG. 19, a timing T3 indicating a start position of a period between a disturbance value C and a disturbance value D, which is minimal in change of disturbance information on axial runout, is an optimal timing for a jump from a shallower layer to a deeper layer. Further, in (b) of the figure, similarly, a timing T4 is an optimal timing of a jump from a deeper layer to a shallower layer.

Further, after the determination in step ST73, one waits based on track learning disturbance information on a recording layer which is a jump destination (ST74). Then, it is determined that a position of enabling stable track retraction is reached (ST75), and an interlayer jump is carried out at a timing which meets the both (ST76).

In FIG. 20, in consideration of a timing based on the learning disturbance information on axial runout in (a) and the track pull-in control after an interlayer jump, a timing T5 is determined such that an optimal timing T6 for track retraction after the interlayer jump is found to be obtained. An interlayer jump is carried out at this timing T5.

With respect to the interlayer jump, it is not always necessary to jump at a timing which meets the both focus and track timings. Therefore, even when an interlayer jump is carried out at a timing based on the learning disturbance information on axial runout, that is at the timing T3 or T4 of FIG. 19, a stable interlayer jump is enabled.

(Application to Disk Face Tilt Adjustment)

Further, tilt adjustment of an optical disk using learning disturbance information will be described. In FIG. 22, a disturbance differentiation device 57 which is a bypass filter and a disk tilt error signal detection circuit 58 are newly provided between the disturbance learning storage device 25 and the compensation controller 20, thereby enabling tilt adjustment of a disk face using learning disturbance information.

In other words, in FIG. 22, the disturbance learning information on axial runout stored in the disturbance learning storage device 25 is converted into a differentiation value by carrying out an arithmetical operation corresponding to differentiation by a differential or HPF (High Pass Filter) through the working of the disturbance differentiation device 57. Here, the differential value for one cycle indicates a tilt of an optical disk. This signal can be processed by a disk tilt error signal detection circuit 58 to be used as an operation quantity to be input to the tilt adjustment mechanism control circuit. This enables effective tilt adjustment of an optical disk using learning disturbance information.

(Application to Non-Constant Disturbance Detection)

Further, a description will be given below with respect to detection of non-constant disturbance caused by a defect, a finger print, or the like and a control operation with this non-constant disturbance using learning disturbance information. In an optical disk device shown in FIG. 23, a learning disturbance comparison circuit 59 is provided between the disturbance learning storage device 25 and the system controller 30. The process is carried out according to the flow chart shown in FIG. 24, thereby enabling detection of non-constant disturbance and control based on the detection.

In other words, in the flow chart shown in FIG. 24, a region in which a non-constant disturbance exists is already found during servo operation. If a current region is a region in which a non-constant disturbance exists (ST82), servo control of the optical head 10 or the objective lens 5 is carried out based on only the learning disturbance information stored in the disturbance learning storage device 25 without using a positioning error signal of the positioning error detection circuit 16 of FIG. 1 (ST87). This enables stable servo control without any confusion with non-constant disturbance.

In the case where a non-constant disturbance region does not exist or in the case where information on the non-constant disturbance region does not exist in step ST82, the disturbance information mixed in a current optical disk is acquired during a predetermined period while applying control (ST83). The thus acquired disturbance information is compared with the disturbance information stored in the disturbance learning storage device 25 by the learning disturbance comparison circuit 59 of FIG. 23. Then, when it is determined that a different signal is mixed as a disturbance (ST84), it is determined that the different disturbance information is a non-constant disturbance such as defect (ST85). Further, in the case where a region of the different disturbance information has been passed (ST86), a region where this non-constant disturbance has occurred is stored in synchronization with a disk rotation cycle. Information on a region (timing) in which this non-constant disturbance exists is used in the previous step ST82. When this region (timing) is established in the next disk cycle, control is carried out using only the learned disturbance information, whereby a function is provided so as to avoid mixing of the non-constant disturbance (ST88).

In addition, if the acquired disturbance information is the same as the learning disturbance information in step ST84, servo control is further carried out by a positioning error signal from the positioning error detection circuit 16 along with compensation using the learning disturbance information (ST89), and the servo control is continued (ST90). Then, after a predetermined period, the process returns to step S81, where detection of the non-constant disturbance and control using the detection are repeated.

By doing so, there can be provided an optical disk device capable of eliminating non-constant disturbance information such as defect in a positioning error detection signal, which should not be used for position control, and enabling stable and reliable focus control or tracking control.

<Fourth Embodiment>

Figure 25:
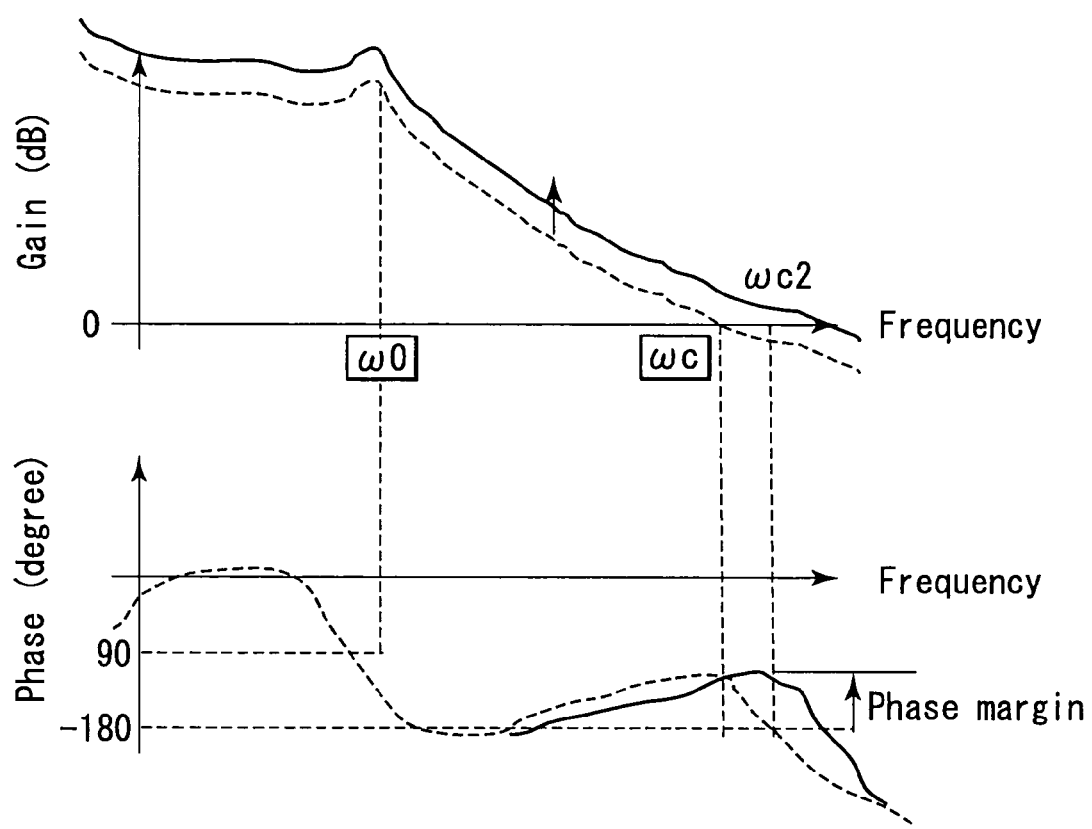
FIG. 25 is a graph showing phase compensation which corresponds to an increase in a servo gain of an optical disk device according to a fourth embodiment of the present invention.

A fourth embodiment provides an optical disk device for carrying out phase adjustment according to a change in a compensation gain when the compensation gain is changed, thereby ensuring a stable operation. FIG. 25 is a graph showing phase compensation corresponding to an increase in a servo gain of the optical disk device according to the fourth embodiment of the present invention.

The optical disk device according to the fourth embodiment is an optical disk for, in the case where a compensation gain of servo control is changed, carrying out phase adjustment by the phase adjuster 50 of FIG. 23 according to the change, thereby ensuring the stable servo operation without servo deviation. In other words, as in the optical disk device according to the first embodiment, in the case where the compensation gain is increased as indicated by solid line as shown in the upper graph of FIG. 25, as well as in the case where the compensation gain is reduced in a stepwise manner, a phase margin is lost and phase adjustment is carried out for the loss, whereby a proper phase margin is established. This makes it possible to ensure a stable servo operation.

Those skilled in the art can achieve the present invention according to a variety of embodiments described above. Further, a variety of modifications of these embodiments are easily invented by those skilled in the art. Even if they do not have inventive ability, the present invention can be applied to a variety of embodiments. Therefore, the present invention covers a wide scope which is not contradictory to the disclosed principle and novel features, and is not limited to the above embodiments.

As described above in detail, according to the present invention, there is provided an optical disk and a disturbance learning method for the optical disk device, in which disturbance learning is carried out in a state in which a compensation gain of a positioning control system is reduced, thereby making it possible to precisely detect a fine disturbance and enabling a control operation with high precision based on precise learning disturbance information.

What is claimed is:

1. An optical disk device, comprising: an optical head which emits a laser beam to an optical disk and receives a reflection light by using an objective lens, thereby carrying out one of a recording process and a reproduction process;
    a position control portion which carries out position control of at least one of the optical head and the objective lens by a compensation gain based on a detection signal from the optical head; and
    a disturbance learning portion which adjusts the compensation gain of the position control portion, detects disturbance information of the optical disk by using the optical head, and stores the disturbance information as learning disturbance information; and
    a phase adjuster which adjusts a phase of the compensation gain according to a degree of reduction when the disturbance learning portion reduces the compensation gain of the position control portion;

wherein the disturbance learning portion reduces the compensation gain in a stepwise manner in a range in which position control of at least one of the optical head of the control portion and the objective lens operates, and detects and stores disturbance information of the optical disk by using the optical head, wherein the disturbance learning portion has a detector for detecting rotation information based on a signal output from the optical head, and carries out learning of the disturbance information at a timing given by this rotation information, and wherein the disturbance learning portion also stores the disturbance information of the optical disk in an area corresponding to a predetermined rotation number of the disturbance information.

2. An optical disk device according to claim 1, further comprising a focus mechanism control portion which controls a position of the objective lens mounted on the optical head based on a focus compensation gain, thereby controlling a focus of the laser light, wherein the position control portion determines and supplies the focus compensation gain to be supplied to the focus mechanism control portion based on a detection signal from the optical head, and the disturbance learning portion adjusts the focus compensation gain, and detects and stores disturbance information of the optical disk by using the optical head.

3. An optical disk device according to claim 1, further comprising a tracking position control portion which position-controls a position of the optical head based on a tracking compensation gain according to a target track, wherein the disturbance learning portion adjusts the tracking compensation gain, and detects and stores disturbance information of the optical disk by using the optical head.

4. An optical disk device according to claim 1, wherein the position control portion further comprises:

a focus mechanism control portion which controls a position of the objective lens mounted on the optical head based on a focus compensation gain, thereby controlling a focus of the laser light; and a tracking position control portion which position-controls a position of the optical head based on a tracking compensation gain according to a target track, wherein the disturbance learning portion adjusts the focus compensation gain and the tracking compensation gain, and detects and stores disturbance information of the optical disk by using the optical head.

5. An optical disk device according to claim 1, wherein the disturbance learning portion carries out learning of the disturbance when the optical disk device does not carry out a recording process and a reproduction process.

6. An optical disk device according to claim 1, wherein the disturbance learning portion stores the disturbance information according to a timing of an output from an encoder coaxial to a spindle motor which rotates the optical disk at a predetermined rotation number.

7. An optical disk device according to claim 1, further comprising a gain adjuster circuit which receives a detection signal detected by the optical head to obtain an average value thereof, and increases or reduces the detection signal according to the average value.

8. An optical disk device according to claim 1, further comprising a gain adjuster circuit which receives a detection signal detected by the optical disk to obtain an average value thereof, increases the detection signal when the average value is equal to or smaller than a first predetermined value, and reduces the detection signal when the average value is equal to or greater than a second predetermined value in order to avoid an effect caused by a difference in physical characteristics between a recorded region and an unrecorded region of the optical disk.

9. An optical disk device according to claim 1, wherein the position control portion carries out position control of at least one of the optical head and the objective lens based on the learning disturbance information stored by the disturbance learning portion.

10. An optical disk device according to claim 1, wherein the position control portion controls the optical head to be jumped with a timing determined based on the learning disturbance information stored by the disturbance learning portion when the optical head is jumped to a target track.

11. An optical disk device according to claim 1, wherein the position control portion controls a tilt of the objective lens mounted on the optical head based on the learning disturbance information stored by the disturbance learning portion.

12. An optical disk device according to claim 1, further comprising a learning disturbance comparison circuit which, after the disturbance learning portion has stored the learning disturbance information, receives a positioning error signal based on a detection signal from the optical head, and compares a value of the positioning error signal with a value of the learning disturbance information while carrying out position control of at least one of the optical head and the objective lens by the position control portion based on the learning disturbance information, wherein, in the case where the learning disturbance comparison circuit determines that these values are different from each other, the position control portion determines that a non-constant disturbance exists in the optical disk, and carries out position control of at least one of the optical head and the objective lens based on only the learning disturbance information.

13. A disturbance learning method for an optical disk device, comprising:

carrying out position control of at least one of an optical head and an objective lens according to a compensation gain, based on a detection signal from the optical head which emits a laser light to the optical disk and receives a reflection light by using the objective lens, thereby carrying out one of a recording process and a reproduction process;

adjusting the compensation gain of a position control portion by a disturbance learning portion, adjusting a phase of the compensation gain by a phase adjuster according to a degree of reduction when the disturbance learning portion reduces the compensation gain of the position control portion;

detecting disturbance information of the optical disk by using the optical head; and storing the disturbance information as learning disturbance information, wherein the compensation gain is reduced in a stepwise manner by the disturbance learning portion in a range in which position control of at least one of the optical head of the control portion and the objective lens operates, and disturbance information of the optical disk is detected and stored by the disturbance learning portion using the optical head, wherein a detector in the disturbance learning portion detects rotation information based on a signal output from the optical head, and carries out learning of the disturbance information at a timing given by this rotation information, and wherein the disturbance information of the optical disk is stored by the disturbance learning portion in an area corresponding to a predetermined rotation number of the disturbance information.

14. A disturbance learning method for an optical disk device according to claim 13, wherein a detection signal detected by the optical head is received to obtain an average value thereof, and the detection signal is increased or reduced according the average value.

15. A disturbance learning method for an optical disk device according to claim 13, wherein the position control portion carries out position control of at least one of the optical head and the objective lens based on the learning disturbance information.

* * * * *